Oct. 2, 1951 W. H. NEWELL ET AL 2,569,571
AUTOMATIC GUN CONTROL SYSTEM
Filed May 5, 1944 14 Sheets-Sheet 1

INVENTORS
WILLIAM H. NEWELL
JAMES D. TEAR
LAWRENCE S. BROWN
Victor D. Borst
ATTORNEY Oct. 2, 1951 W. H. NEWELL ET AL 2,569,571
AUTOMATIC GUN CONTROL SYSTEM
Filed May 5, 1944 14 Sheets-Sheet 4

INVENTORS
WILLIAM H. NEWELL
JAMES D. TEAR
LAWRENCE S. BROWN
Victor D. Borst
ATTORNEY Oct. 2, 1951 W. H. NEWELL ET AL 2,569,571
AUTOMATIC GUN CONTROL SYSTEM
Filed May 5, 1944 14 Sheets-Sheet 5

INVENTORS
WILLIAM H. NEWELL
JAMES D. TEAR
LAWRENCE S. BROWN
ATTORNEY

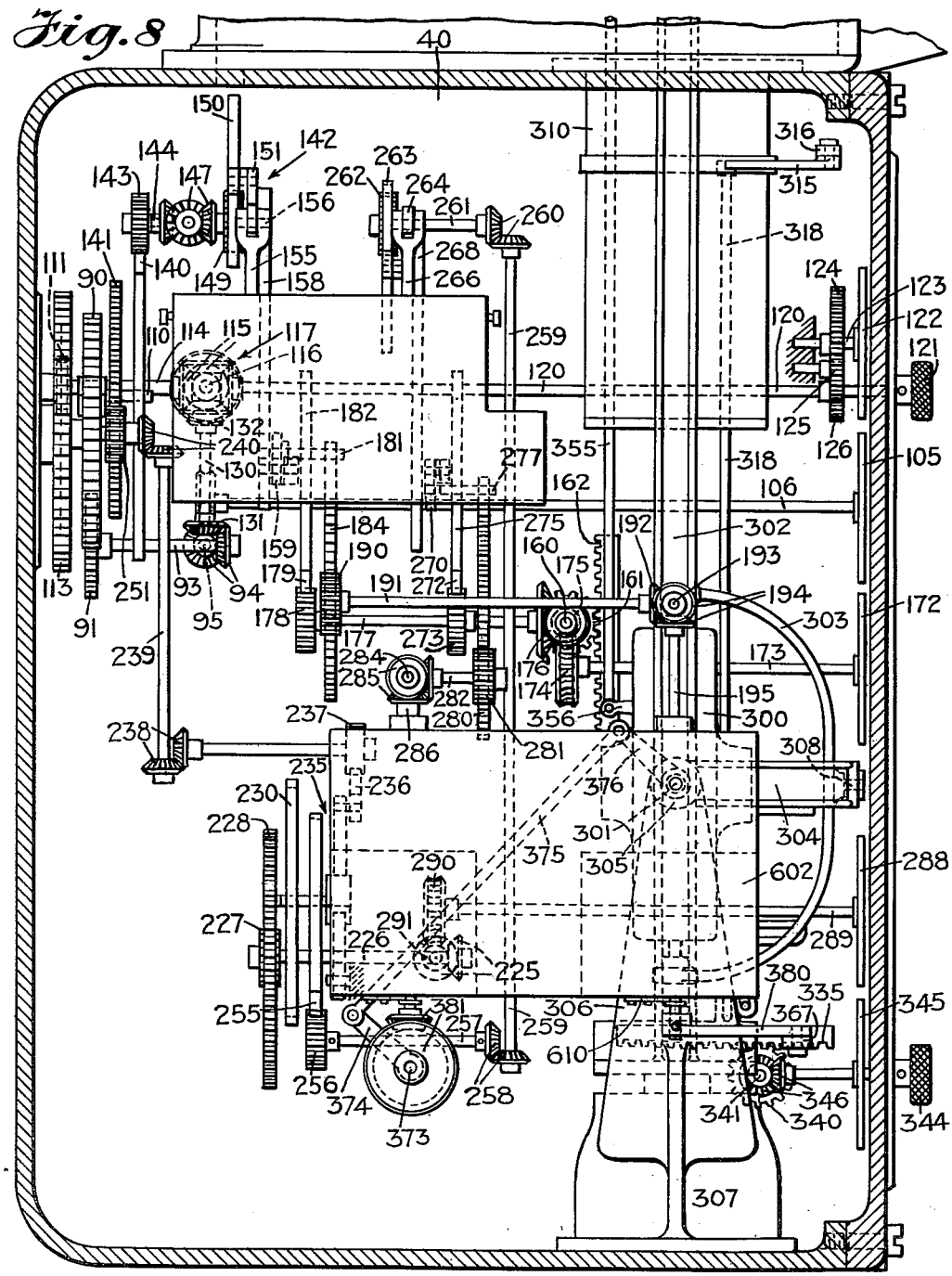

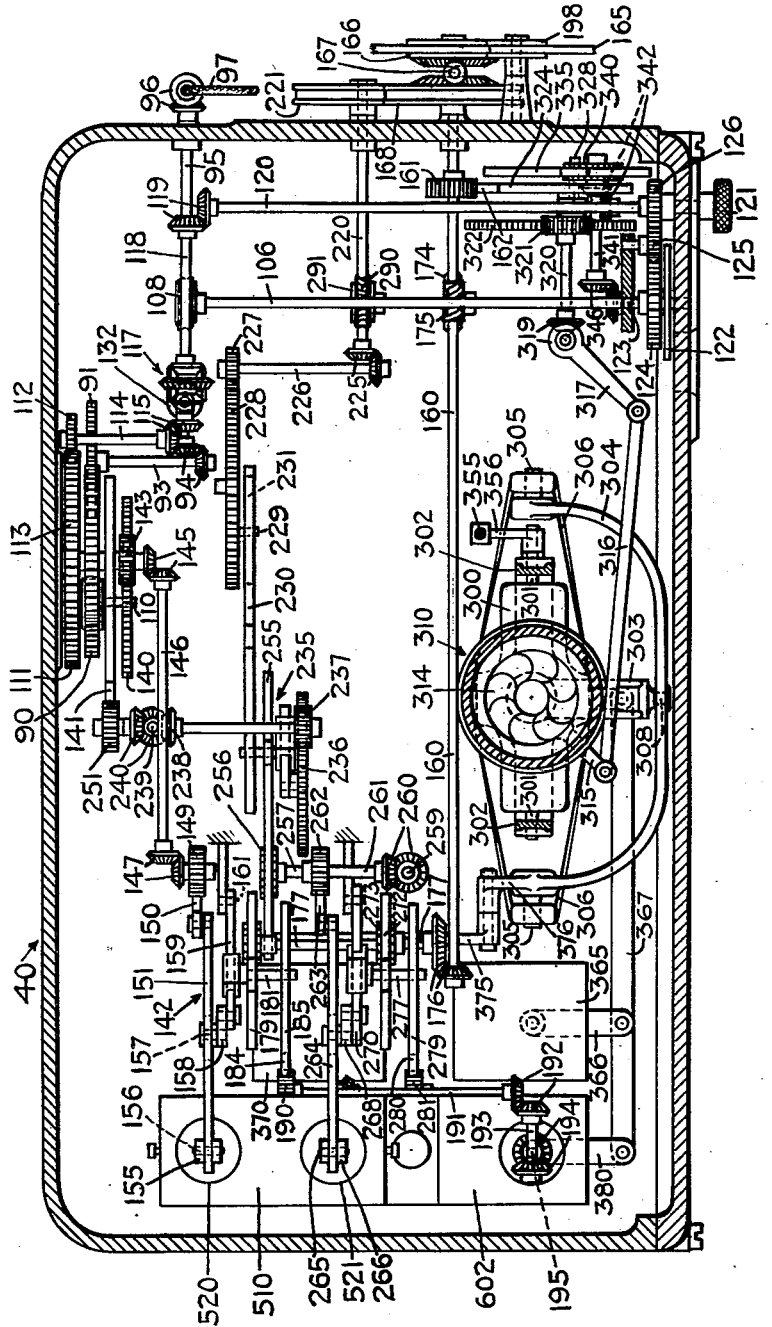

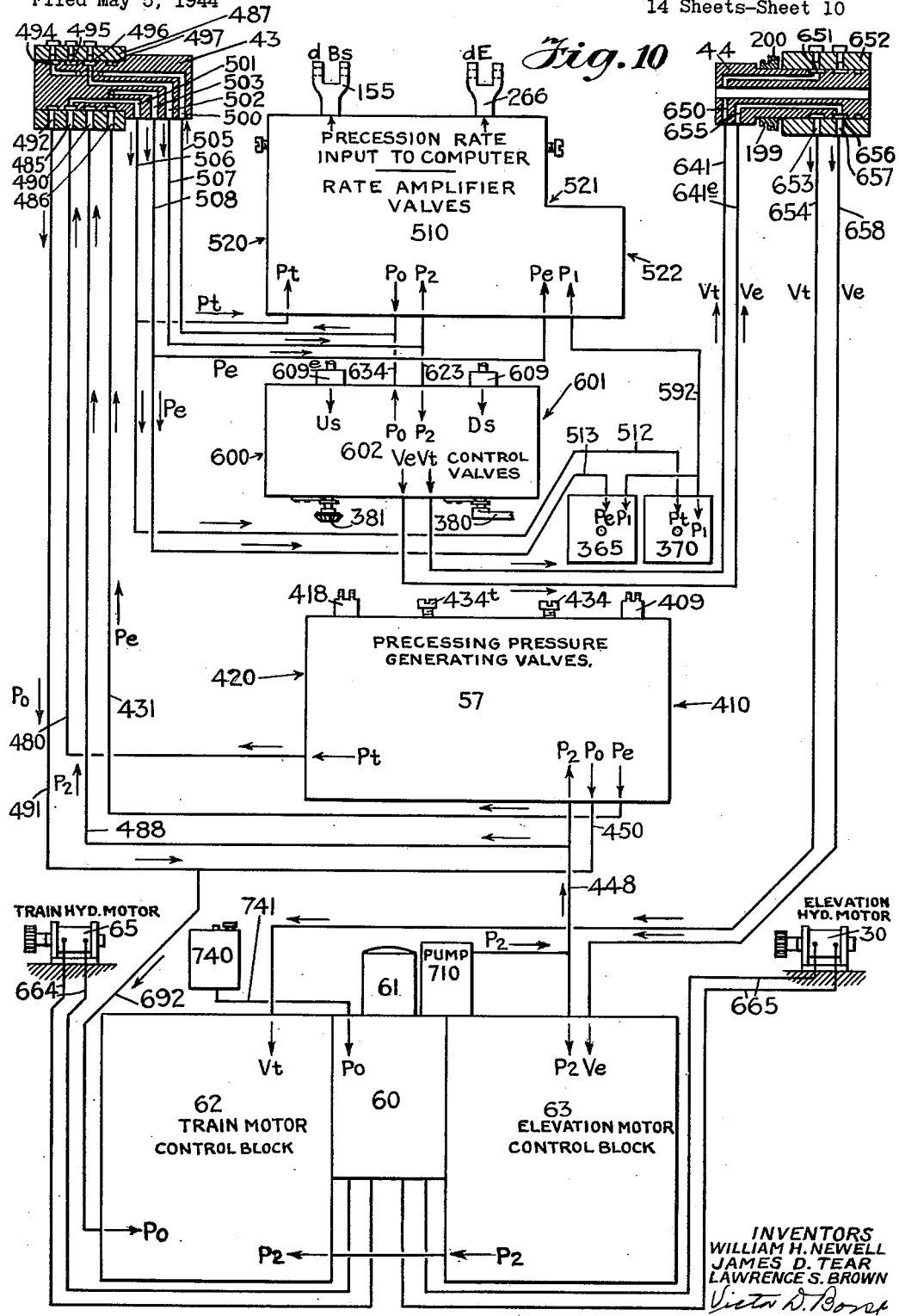

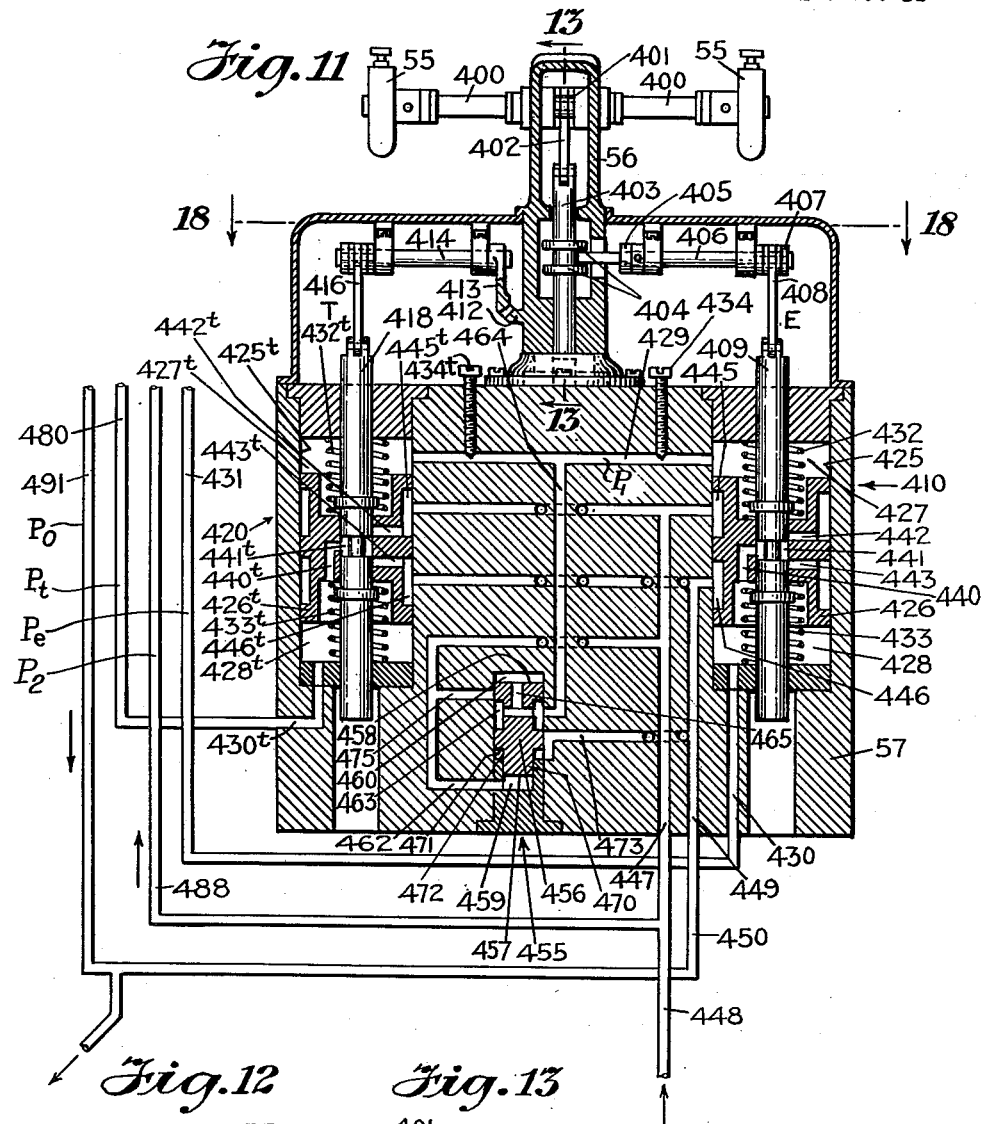

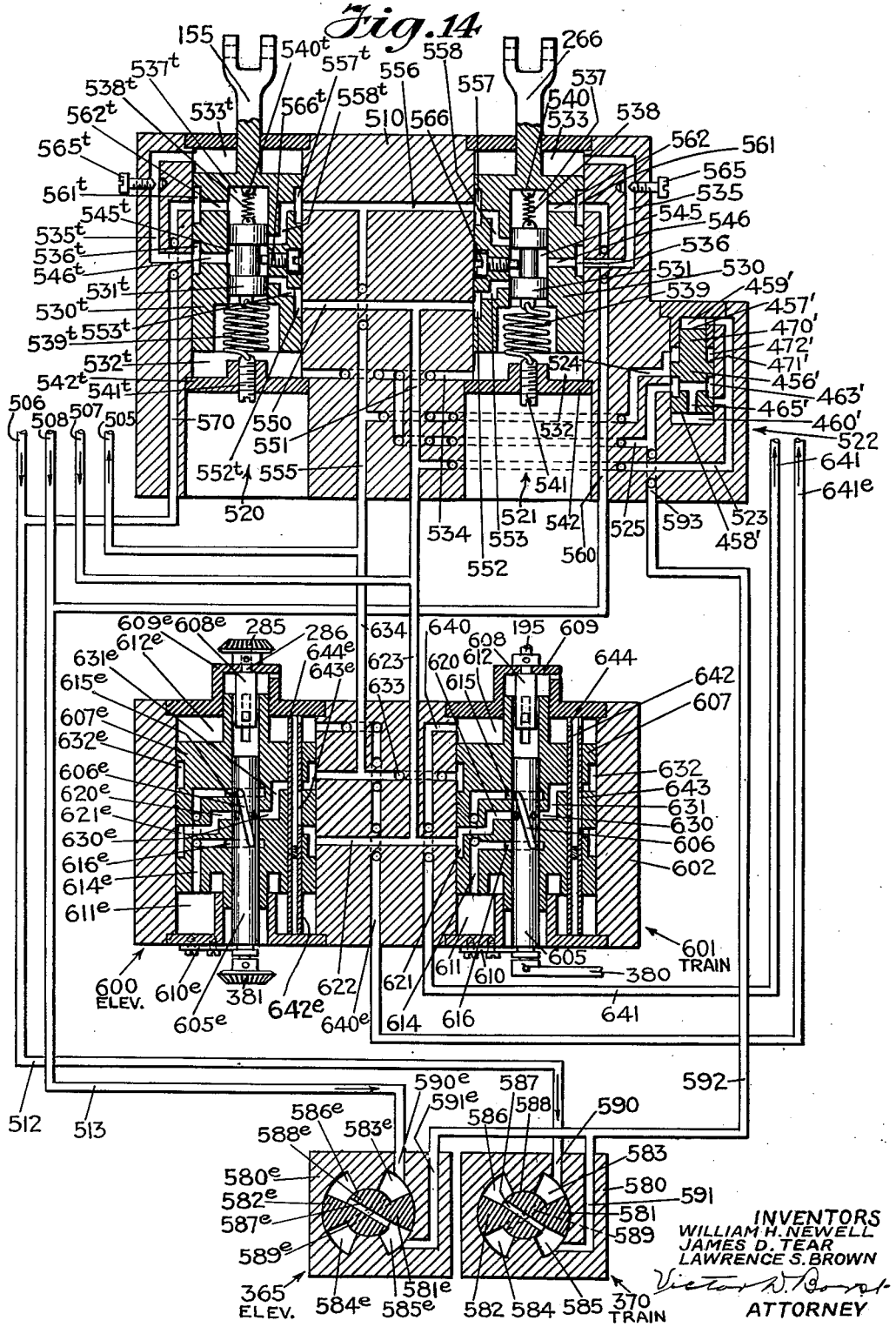

Oct. 2, 1951   W. H. NEWELL ET AL   2,569,571
AUTOMATIC GUN CONTROL SYSTEM
Filed May 5, 1944   14 Sheets-Sheet 13

INVENTORS
WILLIAM H. NEWELL
JAMES D. TEAR
LAWRENCE S. BROWN
ATTORNEY

Oct. 2, 1951 W. H. NEWELL ET AL 2,569,571
AUTOMATIC GUN CONTROL SYSTEM
Filed May 5, 1944 14 Sheets-Sheet 14
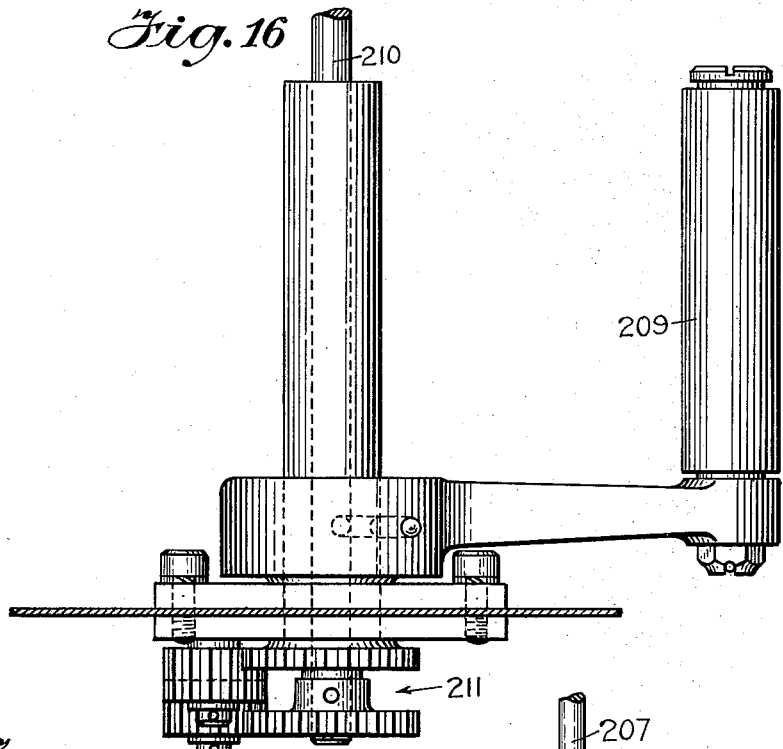
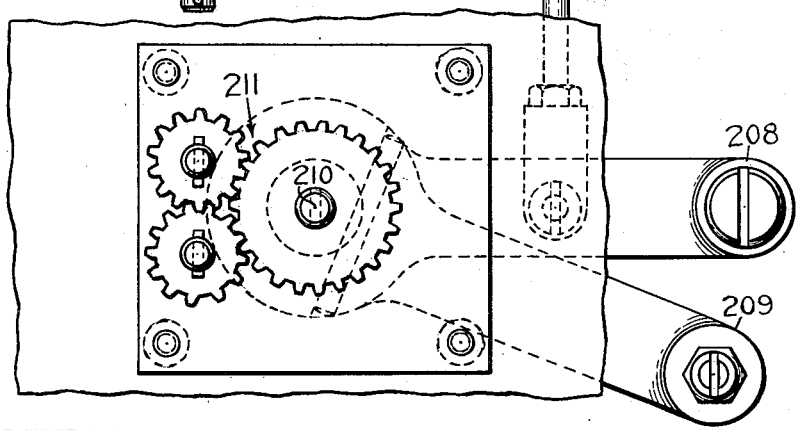
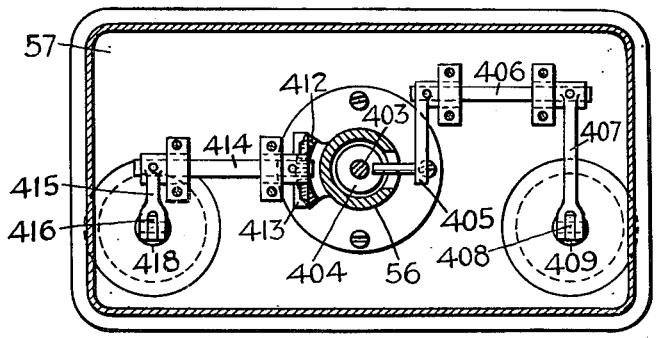
INVENTORS
WILLIAM H. NEWELL
JAMES D. TEAR
LAWRENCE S. BROWN
ATTORNEY

Patented Oct. 2, 1951

2,569,571

UNITED STATES PATENT OFFICE

2,569,571

AUTOMATIC GUN CONTROL SYSTEM

William H. Newell, New York, James D. Tear, Great Neck, and Lawrence S. Brown, Long Island City, N. Y., assignors to The Sperry Corporation, a corporation of Delaware Application May 5, 1944, Serial No. 534,330

7 Claims. (Cl. 89—41)

This invention relates to automatic gun control systems of the type in which a gun mount is driven in response to movement of a precessed gyroscope at controlled rates of train and elevation and the gun is automatically given a lead or deflection with respect to the line of sight, both in train and in elevation, which is a function of the range, the speed of the observer and the rates of train and elevation.

More particularly, the system includes a sighting mechanism controlled by the gyroscope to maintain the line of sight parallel to the spin axis of the gyroscope. Precessing forces are set up by the observer or gunner and applied to the gyroscope to maintain the sight on the target. These precessing forces, which determine and are proportional to the rate of the gyroscope, are also set into an automatic computing mechanism the output of which controls the deflection between the sight and the gun.

The gunner also actuates a range finding mechanism connected to set into the automatic computing mechanism the range, which at the short ranges of aircraft guns for example, is assumed to be proportional to the time of flight. In one embodiment this range finding mechanism is operated by a pair of foot pedals which are connected for opposed movement so that when one pedal moves upwardly the other pedal moves downwardly. In this way the effect of jolts or bumps is eliminated and a more accurate and dependable control of the range input is obtained.

The range finder mechanism includes a divider which automatically divides the size of the target by the range set into the computing mechanism by the operation of the foot pedals. The output of the divider represents the angle subtended by the target at the set range. The size of the target is introduced by a manual setting. The speed of the observer or of the gunner's own ship is set into the automatic computing mechanism by a manual adjustment.

The outputs of the automatic computing mechanism representing sight deflections in train and elevation are connected to modify the action of a follow-up mechanism which controls the elevation and train motors of the gun mount to maintain the gun at the required firing angle.

As applied to a bomber turret for example, a control handle is accessible to the gunner while in sighting position in the turret and is connected to control the precessing forces so that the gunner merely actuates the control handle in a manner to keep the line of sight on the moving target, and the range finding mechanism in a manner to maintain correct range adjustments. The automatic computing mechanism then operates to set the required deflection or lead into the follow-up mechanism which automatically keeps the guns at the correct firing angle.

An object of this invention is to provide a mechanism of the above type having novel and improved details of construction and features of operation.

Another object is to provide a system of the above type which is suited to production and operation under military conditions.

Another object is to provide a system of the above type which is of wide application to various types of turrets on shipboard, planes, land vehicles, fixed anti-aircraft guns and the like.

Other objects and advantages will be apparent as the nature of the invention is more fully disclosed.

In accordance with the present invention a hydraulic system is provided for applying the precessing forces to the gyroscope, for setting the rates of elevation and train into the computing apparatus and for driving the gun mount or turret in accordance with the position of the gyroscope and the output of the computer. This hydraulic system includes a pair of pressure control valves actuated in accordance with the position and rate of movement of the gunner's control handle to generate control pressures corresponding to the desired rates of train and elevation respectively. These control pressures are applied directly to precessing force motors which apply precessing forces to the gyroscope, and are also applied through hydraulic rate amplifier valves to rate input linkages of the automatic computing apparatus.

Control valves actuated by the gyroscope are connected to control the hydraulic follow-up apparatus which drives the gun mount or turret. The automatic computing apparatus sets the deflection into the control valve mechanism so that the position taken by the gun mount or turret corresponds to the angle of the gyroscope or sight plus the computed deflection by which the gun must be deflected from the line of sight.

The range is set into the computer from a range finding mechanism which is adjusted manually in accordance with the known size of the target and the range. The range finding mechanism is adjusted to position the range determining member of a range finder such as an iris diaphragm, which is maintained by the gunner at a size to just encompass the target. The range finder may be actuated by a foot control so that the gunner can actuate the same continuously while causing the sight to follow the target by means of his hand control. These are the only manual operations required of the gunner apart from an initial setting of the speed of his own ship and pressing the firing button when the guns are to be fired.

In a system of this type the gunner may ride in the turret or the tracking, range finding and computing mechanism may be located at a remote point as in a director. With this arrangement, several gun mounts may be operated in unison by the same director.

Although the novel features which are believed to be characteristic of this invention are pointed out more particularly in the claims appended hereto, the nature of the invention will be better understood by referring to the following description, taken in connection with the accompanying drawings in which a specific embodiment thereof has been set forth for purposes of illustration.

In the drawings,

Fig. 8 is a side elevation of the mechanism within the control box;

Fig. 9 is a plan view thereof;

Fig. 10 is a diagram of the hydraulic system;

Fig. 11 is a section through the hydraulic control pressure valve block showing the control handle and the hydraulic connections;

Fig. 12 is a side elevation of the manual control handle and support therefor;

Fig. 13 is a vertical section through the control handle and support;

Fig. 14 is a sectional view through the rate amplifier valve block, the spiral follow-up valve block, and the precessing motor block, showing the hydraulic connections;

Fig. 16 is a plan view of the range foot pedal on the left of the operator and its frame connection;

Fig. 17 is a side elevation of the mechanism shown in Fig. 16 showing its gear connections; and Fig. 18 is a plan view partly in section of the operator's hand control valve mechanism taken on line 18—18 of Fig. 11.

Certain specific terms are used herein for convenience in referring to various details of the invention. These terms, however, are to be given an interpretation commensurate with the state of the art.

Figure 1:
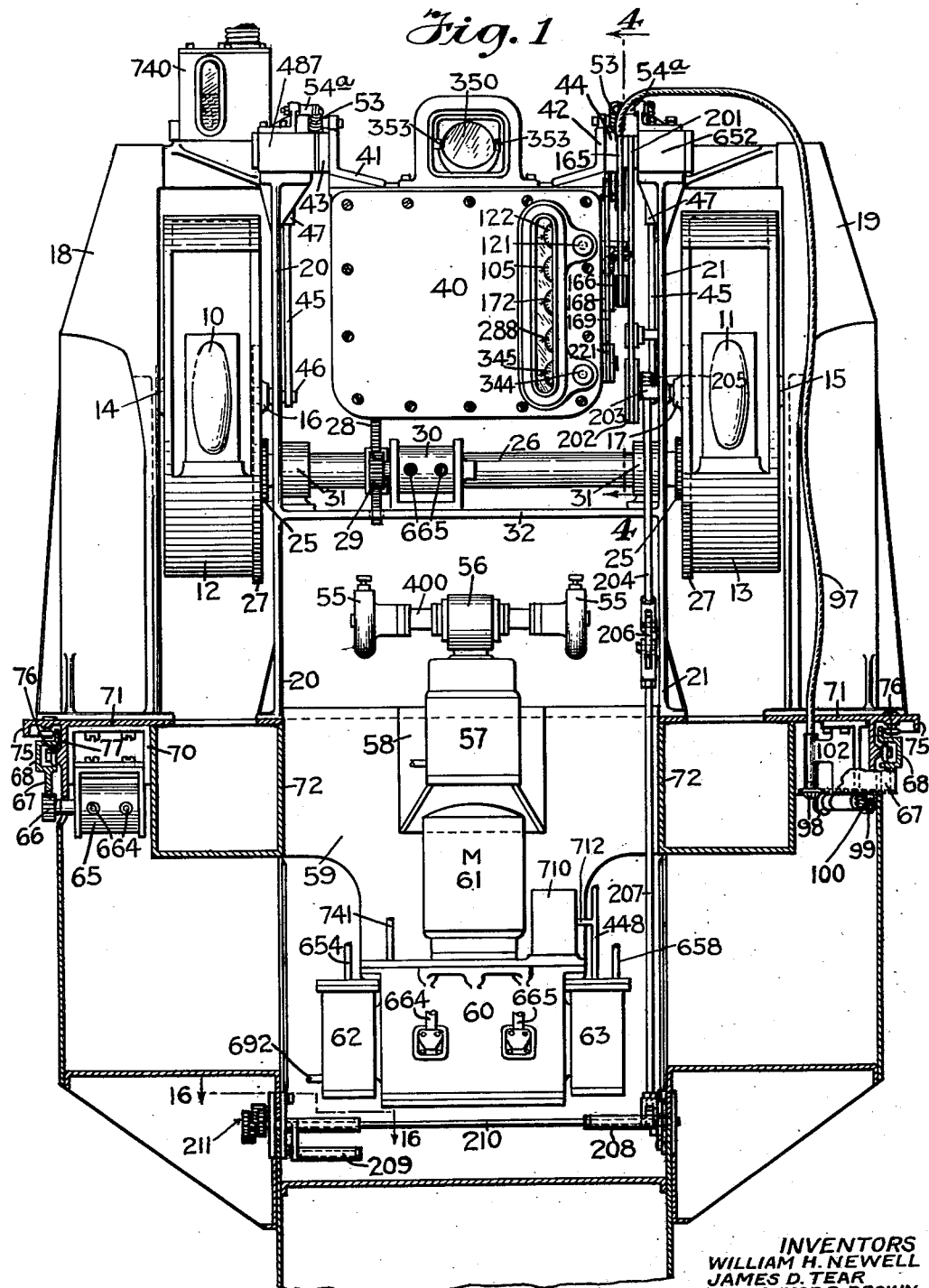
Fig. 1 is a vertical section through a gun turret showing the control mechanism in front elevation.
Figure 2:
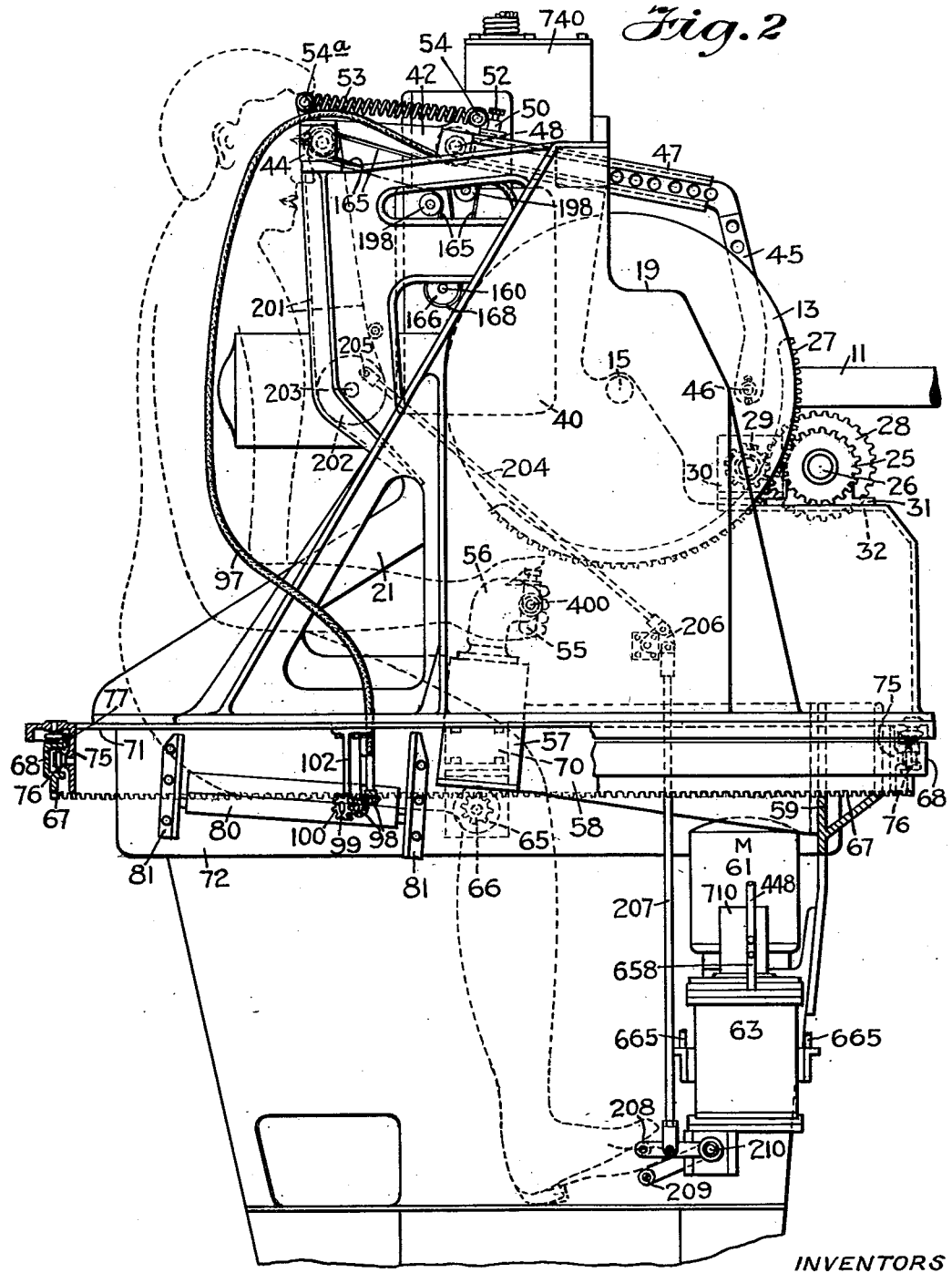
Fig. 2 is a side elevation of the control mechanism shown in Fig. 1.
Figure 3:
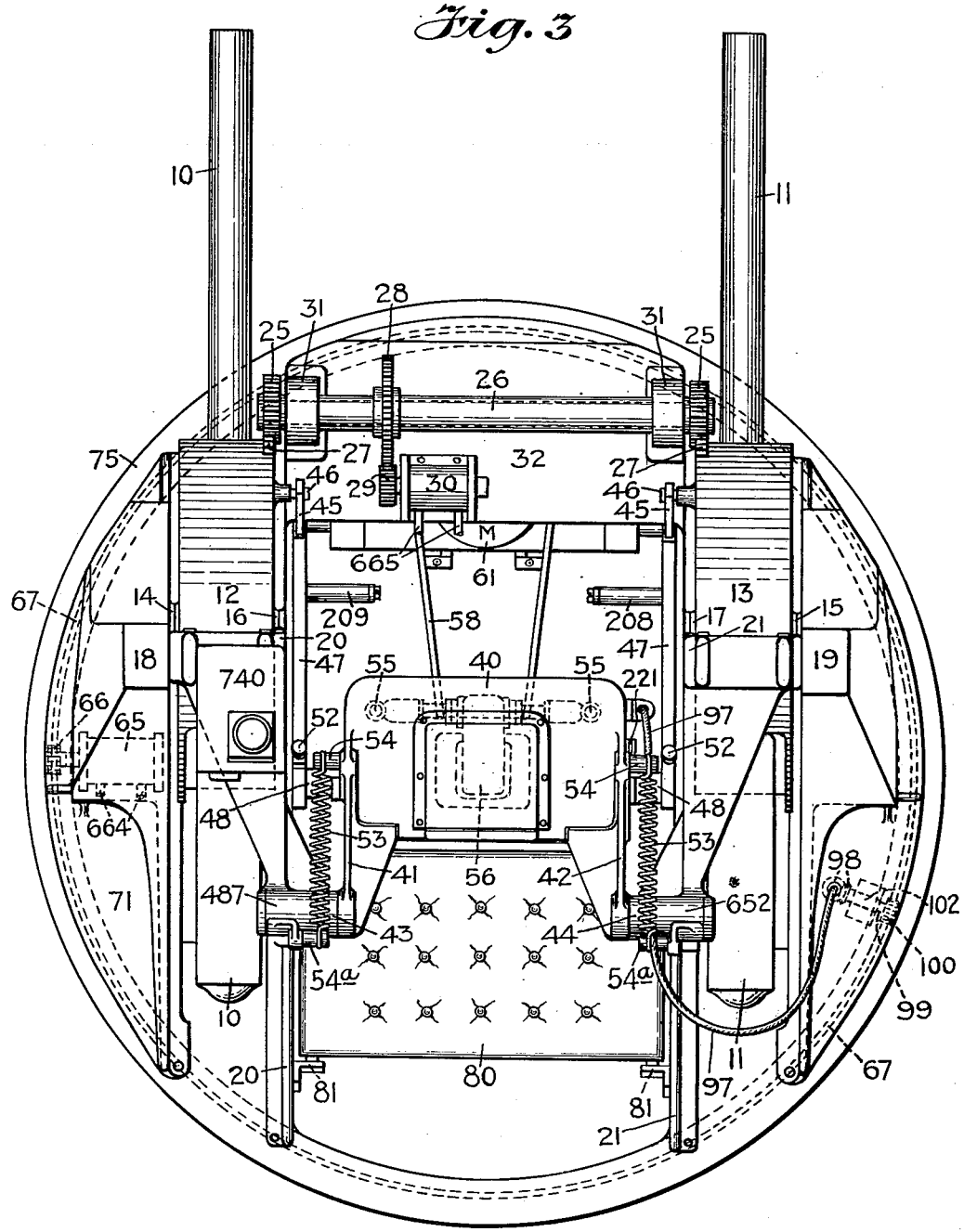
Fig. 3 is a top plan view thereof.

Referring to Figs. 1, 2 and 3, the mechanism is shown as comprising a pair of guns 10 and 11 carried in cylindrical gun mounts 12 and 13 respectively which are pivoted for movement in elevation about outer horizontal trunnions 14 and 15 respectively and inner horizontal trunnions 16 and 17 respectively. The outer trunnions 14 and 15 are carried by outer brackets 18 and 19 respectively. The inner trunnions 16 and 17 are carried by inner brackets 20 and 21 respectively.

The gun mounts 12 and 13 are adjusted in elevation by means of gears 25 mounted upon an elevation shaft 26 and engaging circular racks 27 on the gun mounts 12 and 13. The elevation shaft 26 carries a gear 28 which is driven by a pinion 29 actuated by a hydraulic motor 30 mounted on a support 32 which extends between the inner brackets 20 and 21. The elevation shaft 26 is mounted in brackets 31 attached to the support 32.

A control box 40 containing the automatic computing mechanism, the gyro-control mechanism and the range finder, all to be described, is mounted on brackets 41 and 42 (Fig. 3), which are journalled in trunnions 43 and 44 respectively carried by the inner frame members 20 and 21. The box 40 is constrained for movement in elevation with the gun mounts 12 and 13 by a pair of linkages comprising links 45 pivotally mounted by pins 46 to the gun mounts 12 and 13 and telescoping into links 47 which are pivoted at 48 to the brackets 41 and 42. The links 45 are latched to the links 47 by pins 49 (see Fig. 4) which may be withdrawn to permit the links 45 and 47 to be separated so as to disconnect the box 40 from the gun mounts 12 and 13. The box 40 is counter-balanced by springs 53 connected between the pins 54 on the brackets 41 and 42 and stationary pins 54a carried by the inner brackets 20 and 21.

Figure 4:
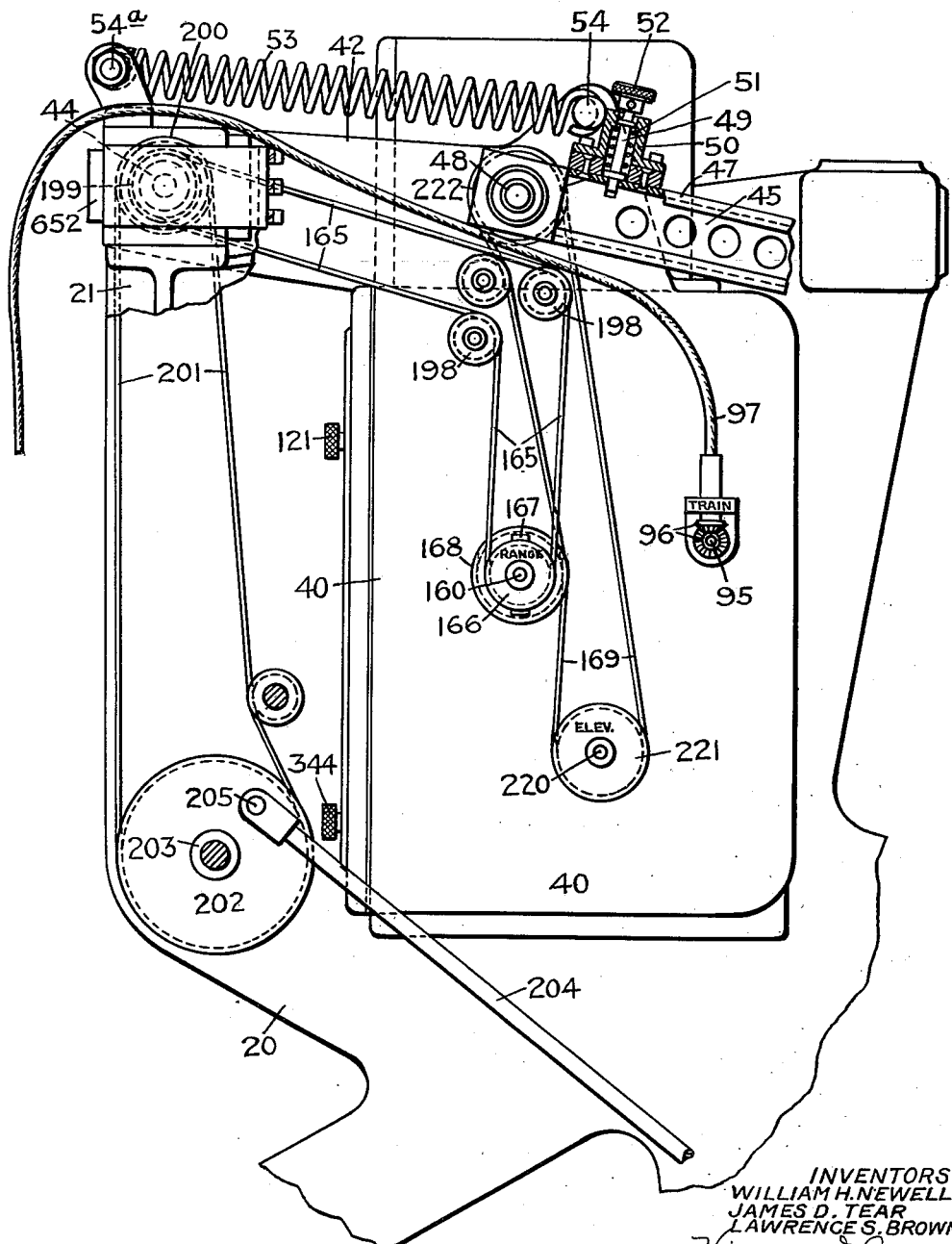
Fig. 4 is a side elevation of a control box and associated mechanism.

Referring to Fig. 4, the pin 49 is shown as mounted in a bracket 50 and held downwardly by a pressure spring 51. The pin is provided with a knob 52 to provide manual means for withdrawing the pins to disconnect the links 45 and 47 as above mentioned.

Referring again to Fig. 1, a pair of control handles 55 are mounted on a horizontal shaft 400, journalled in a bracket 56 which is mounted for rotation about a vertical axis on a block 57 (Figs. 1 and 11) containing the hydraulic pressure control valves to be described for controlling the precessing pressures. The block 57 is mounted on a bracket 58 (Figs. 1, 2 and 3) which is attached to a transverse plate 59 extending between the inner brackets 20 and 21.

The transverse plate 59 also carries a pump block 60 (Figs. 1, 10 and 15) on which the main motor 61 is mounted and to which valve blocks 62 and 63 are connected. The valve blocks 62 and 63 control the supply of fluid from the pump to the hydraulic elevation motor 30 and to a hydraulic train motor 65 (Fig. 1) driving a gear 66 which cooperates with a rack 67 on a stationary frame ring 68. The train motor 65 is mounted on a bracket 70 which is attached to the frame 71 of the movable turret. The frame 71 supports the outer brackets 18 and 19 and carries cross beams 72 which support the inner brackets 20 and 21 and the transverse plate 59. The frame 71 includes an outer annular member 75 carrying rollers 76 which engage in an annular track 77 on the stationary frame ring 68. The train motor 65 causes the entire turret to rotate inside the track 77. A seat 80 for the gunner is mounted on brackets 81, Figs. 2 and 3, attached to the cross-beams 72.

The general arrangement of the apparatus so far described is such that the gunner rotates the handles 55 about a horizontal axis in accordance with variations in elevation to be applied to the sight for causing it to follow the target in elevation and rotates the bracket 56 about its vertical axis in accordance with variations in train which are to be applied to the sight. This rotation of the handles 55 actuates suitable valves within the valve block 57 to generate pressures which are proportional to the amount and rate of movement of the handles 55 in train and in elevation. These pressures are applied to hydraulic control mechanism within the control box 40 as precessing forces to cause the gyroscope to precess in the desired direction and at a rate depending upon the precessing forces. The precessing pressures also actuate the rate input linkages of the automatic computing mechanism within the control box 40.

These precessing forces then cause the gyroscope and the sight which is associated therewith to move in train and in elevation as desired. This movement of the gyroscope in turn actuates the spiral follow-up valve mechanism within the control box 40 to control the valves within the valve blocks 62 and 63 so as to cause the pumps within the pump block 60 to supply fluid at controlled rates to actuate the elevation motor 30 and the train motor 65. The automatic computing mechanism automatically sets into the follow-up valves the proper deflection so that the gun is caused to be displaced from the line of sight in train and elevation the correct amount for causing the projectile to hit the moving target.

*Computing mechanism*

Referring now to Figs. 4, 5 and 7-9, the computing mechanism is shown as of the general type disclosed in the co-pending application of James D. Tear and Charles W. Buckley, Ser. No. 375,426, filed Jan. 22, 1941, for Gun Sights, and now Patent No. 2,407,191. In that application it is shown that the total deflection of the guns from the sight in train and in elevation may be represented by the following formulae:

(1) $\quad Ds = T\ (dBs - K1 So\ \sin Bg + k2)$
(2) $\quad Us = T\ (dE - K3 So\ \cos Bg\ \sin Eg + k4)$ wherein $Ds$ represents the deflection of the gun in train with respect to the sights. $T$ represents the time of flight; $dBs$ represents the bearing rate or the rate of train; $So$ represents the speed of the observer's own ship; $Bg$ is the bearing of the gun; $dE$ represents the rate of elevation; $Eg$ the angle of elevation of the gun; $Us$ the required elevation of the gun with respect to the plane of the sight or the deflection in elevation; and $K1$, $k2$, $K3$ and $k4$ represent constants.

The constants $K1$, $k2$, $K3$ and $k4$ are taken care of by the selection of the gears in the computing mechanism. These constants may be eliminated from the equations which may then be written as follows:

(3) $\quad Ds = T\ (dBs - So\ \sin Bg)$
(4) $\quad Us = T\ (dE - So\ \cos Bg\ \sin Eg)$ Equations 3 and 4 therefore represent the equations which must be solved by the automatic computing mechanism in order to arrive at the deflection in train $Ds$ and the deflection in elevation $Us$ which must be set into the follow-up valves.

Figure 5:
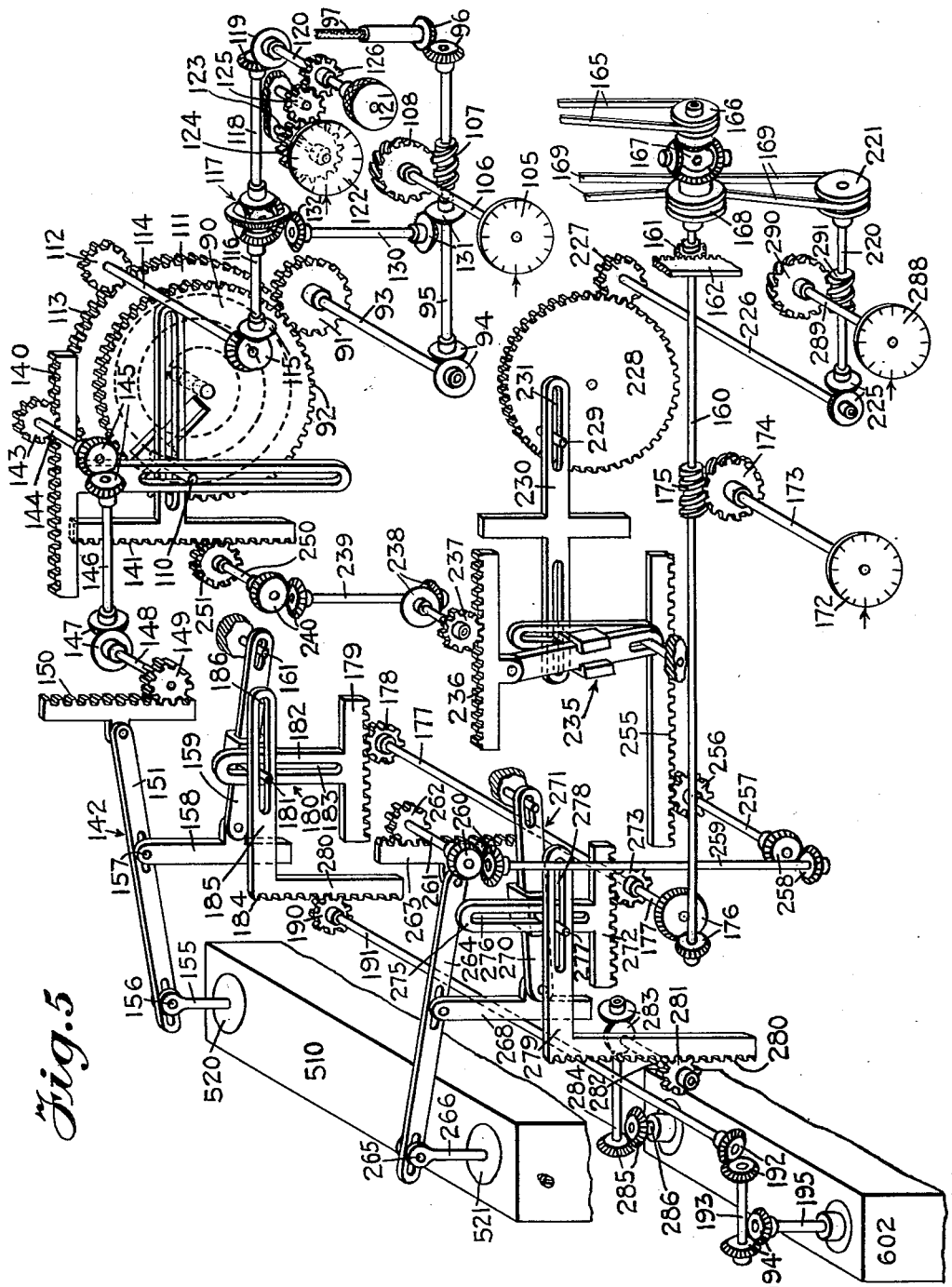
Fig. 5 is a diagram of the computing mechanism.

Referring now to Fig. 5, the computing mechanism is shown as comprising a train disc 90 which is angularly adjusted in accordance with the bearing of the gun $Bg$ by a gear 91 meshing with teeth 92 of the train disc 90 and carried on a shaft 93 which is driven through bevelled gears 94 by a train shaft 95. The train shaft 95 is driven through bevelled gears 96 by a flexible train shaft 97 which, as shown in Figs. 1 to 4, is located on the outside of the control box 40 and is driven through bevelled gears 98 from a shaft 99 carrying a pinion 100 meshing with the stationary rack 67 on the frame ring 68. The free end of the flexible shaft 97 and the shaft 99 are mounted on a bracket 102 which is attached to the frame 71 of the turret and rotates therewith, so that the train of the turret, which corresponds to the bearing of the gun $Bg$, is fed by the shaft 97 into the train shaft 95 of the computing mechanism and causes a corresponding rotation of the train disc 90.

A train dial 105, mounted on a shaft 106, is driven from the train shaft 95 through a worm 107 and worm gear 108. The train dial 105 is mounted to be visible from the front of the box 40 as shown in Fig. 1.

The speed of the observer's own ship ($So$) is the vector represented by the radial distance of a pin 110 from the center of the train disc 90. This radial distance of the pin 110 is controlled by a spiral groove in a speed disc 111 which is mounted concentric with the train disc 90 and is rotated with respect to the train disc by a pinion 112 engaging teeth 113 on the periphery of the speed disc 111 and mounted on a shaft 114 which is driven through bevelled gears 115 by a shaft 116 which is connected to one side of a differential 117. The other side of the differential 117 is driven by a shaft 118 which connects through bevelled gears 119 with a shaft 120 which is controlled by a speed control knob 121 mounted in accessible position on the outside of the box 40 as shown in Fig. 1. A speed dial 122 is mounted on a shaft 123 carrying a gear 124 meshing with a gear 125 which, in turn is driven by a gear 126 on the shaft 120. The speed dial 122 is likewise mounted in a position to be observed from the front of the box 40.

In order to prevent adjustment of the train disc 90 from changing the relative position of the train disc 90 and the speed disc 111, a compensating connection is provided comprising a shaft 130 driven through bevelled gears 131 from the train shaft 95 and carrying a bevelled gear 132 which drives the housing of the differential 117 so that movement of the train shaft 95 causes adjustment of the train disc 90 and speed disc 111 in unison, whereas adjustment of the speed shaft 118 causes relative movement between the train disc 90 and the speed disc 111 for adjusting the radial position of the pin 110.

The pin 110 actuates a sine rack 140 and a cosine rack 141 which are of standard construction. The movement of the sine rack 140 thus represents $So\ \sin Bg$ whereas movement of the cosine rack 141 represents $So\ \cos Bg$. Motion of the sine rack 140 is transferred to the input of a differential mechanism 142 by a gear train comprising pinion 143, shaft 144, bevelled gears 145, shaft 146, bevelled gears 147, shaft 148, pinion 149 and rack 150. The rack 150 is pivoted to an arm 151 which forms a part of the differential mechanism 142.

The rate of train $dBs$ is fed into the differential mechanism 142 by a link 155 actuated by a hydraulic rate amplifier valve mechanism to be described, so as to have a longitudinal movement proportional to the rate of train. This link 155 is connected by a pin 156 to the arm 151 as the second input to the differential 142. An intermediate portion of the arm 151 is pivoted by a pin 157 to a link 158 which actuates the arm 159 which turns about a fixed pivot 161. The movement of the arm 159 accordingly corresponds to the differential movement of the two ends of the arm 151, so that its angular position represents $dBs - So \sin Bg$.

The time of flight (T) is set into the computing apparatus by a range shaft 160. Range shaft 160 carries a pinion 161 driving a rack 162 which actuates a range finding mechanism to be described. The range is manually set into the shaft 160 by a range tape 165 actuated by means to be described, which engages a range pulley 166 connected to drive one side of a differential 167. The other side of the differential 167 carries an elevation pulley 168, driven by an elevation tape 169 in a manner to compensate for movement of the range tape 165 produced by movement in elevation of the box 40.

The range shaft 160 drives the range dial 172, mounted on a shaft 173 carrying a worm gear 174 which is driven by a worm 175 mounted on the shaft 160. The range dial 172 is mounted on the front of the box 40 as shown in Fig. 1.

The range shaft 160 drives bevelled gears 176 which drive a shaft 177 carrying a pinion 178 meshing with a rack 179 forming one input to a multiplier 180. The second input to the multiplier 180 is the pivoted arm 159 above mentioned which carries a pin 181 slidably mounted thereon. The rack 179 carries a T-arm 182 having a slot 183 in which the pin 181 slides. The output of the multiplier 180 comprises a rack 184 having an L-arm 185 provided with a slot 186 in which the pin 181 slides. The movement of the rack 184 accordingly represents the product of the inputs from the pivoted arm 159 and the rack 179 or $T(dBs - So \sin Bg)$ which from Equation 1 is seen to represent the deflection $Ds$. This movement is transferred by a pinion 190 and shaft 191, through a gear train comprising bevelled gears 192, shaft 193 and bevelled gears 194, to a shaft 195 which is connected to the hydraulic spiral follow-up valve to be described. The movement of the shaft 195 thus represents the computed horizontal deflection $Ds$ by which the gun must be offset from the line of sight.

The range tape 165, as shown in Fig. 4, passes around idler pulleys 198 and engages a pulley 199 which is loosely mounted about the trunnion 44. A second idler pulley 200, which is attached to the first idler pulley 199, is engaged by a belt 201 passing around a belt pulley 202 which, as shown in Fig. 1, is mounted on a bracket 203 carried by the inner bracket 21. The belt pulley 202 is operated by a link 204 which is pinned to the pulley 202 by a pin 205. The link 204 engages a bell crank lever 206 (Figs. 1 and 2) which is mounted on the inner bracket 21 and is actuated by a link 207 attached to a foot pedal 208 in a position to be operated by the foot of the gunner. A pair of foot pedals 208 and 209 are shown in Figs. 1, 2 and 16 and 17 which are connected by a shaft 210 and gears 211 to be actuated in opposite directions so that as one foot is elevated the other foot is depressed. In this way an accurate control is obtained as the operation of the foot pedals is not influenced by the jars to which the gunner may be subjected. The range tape or belt 165 is thus operated through the linkages above mentioned by the foot pedals 208 and 209 by an amount which the gunner determines from the range finder, to be described, which is operated by the rack 162.

Elevation is fed into an elevation shaft 220 by an elevation pulley 221 actuated by the elevation tape 169. The tape 169 passes around the pulley 222 which is concentric with pivot 48 and is fixed to the link 47 (Fig. 4) to be actuated by pivotal movement of said link.

The elevation shaft 220 connects through bevelled gears 225 and shaft 226 to a pinion 227 which actuates an elevation disc 228 carrying a pin 229. The pin 229 actuates a sine bar 230 having a slot 231 into which the pin 229 extends. The movement of the elevation disc 228 corresponds to the elevation of the gun $Eg$ and the movement of the sine bar 230 corresponds to $\sin Eg$. This movement is fed into a multiplier 235 which is similar in construction to the multiplier 180 and has an input rack 236 actuated by a pinion 237 through gears 238, shaft 239, gears 240, shaft 250 and pinion 251 from the cosine rack 141. The movement of the rack 236 accordingly represents $So \cos Bg$. This movement is multiplied in the multiplier 235 by the movement of sine bar 230 which represents $\sin Eg$, to produce a movement of the rack 255 which corresponds to $So \cos Bg \sin Eg$, which movement is transferred by pinion 256, shaft 257, bevelled gears 258, shaft 259, bevelled gears 260, shaft 261 and pinion 262 to rack 263 of a differential arm 264. The opposite end of the differential arm 264 is connected by a pin 265 to a link 266 which is actuated by the hydraulic rate amplifier valve to be described to have a longitudinal movement corresponding to the rate of elevation $dE$. The output of the differential arm 264 is taken through a link 268 which is pivoted at an intermediate point of the arm 264 and which accordingly has a movement which represents $dE - So \cos Bg \sin Eg$. This movement positions an input arm 270 of a multiplier 271, wherein it is multiplied by the time of flight T. This is accomplished by an input rack 272 driven by a pinion 273 on the range shaft 177. The rack 272 is provided with a T-arm 275 having a slot 276 engaging a pin 277 slidably mounted on the arm 270. The pin 277 engages a slot 278 in an output arm 279 having a rack 280. Movement of the rack 280 accordingly represents $$T(dE - So \cos Bg \sin Eg)$$

which is Equation 2 for the vertical deflection $Us$ to be applied to the gun. This deflection is taken from the rack 280 by the pinion 281, shaft 282, bevelled gears 283, shaft 284, and bevelled gears 285 to a shaft 286 associated with the elevation follow-up valve to be described and thereby sets into the shaft 286 a movement corresponding to the calculated vertical deflection $Us$.

An elevation dial 288 which is visible from the front of the box 40, as shown in Fig. 1, is mounted on a shaft 289, Fig. 5, driven by a worm gear 290 from a worm 291 carried on the elevation shaft 220.

Gyrocontrol apparatus

Figure 6:
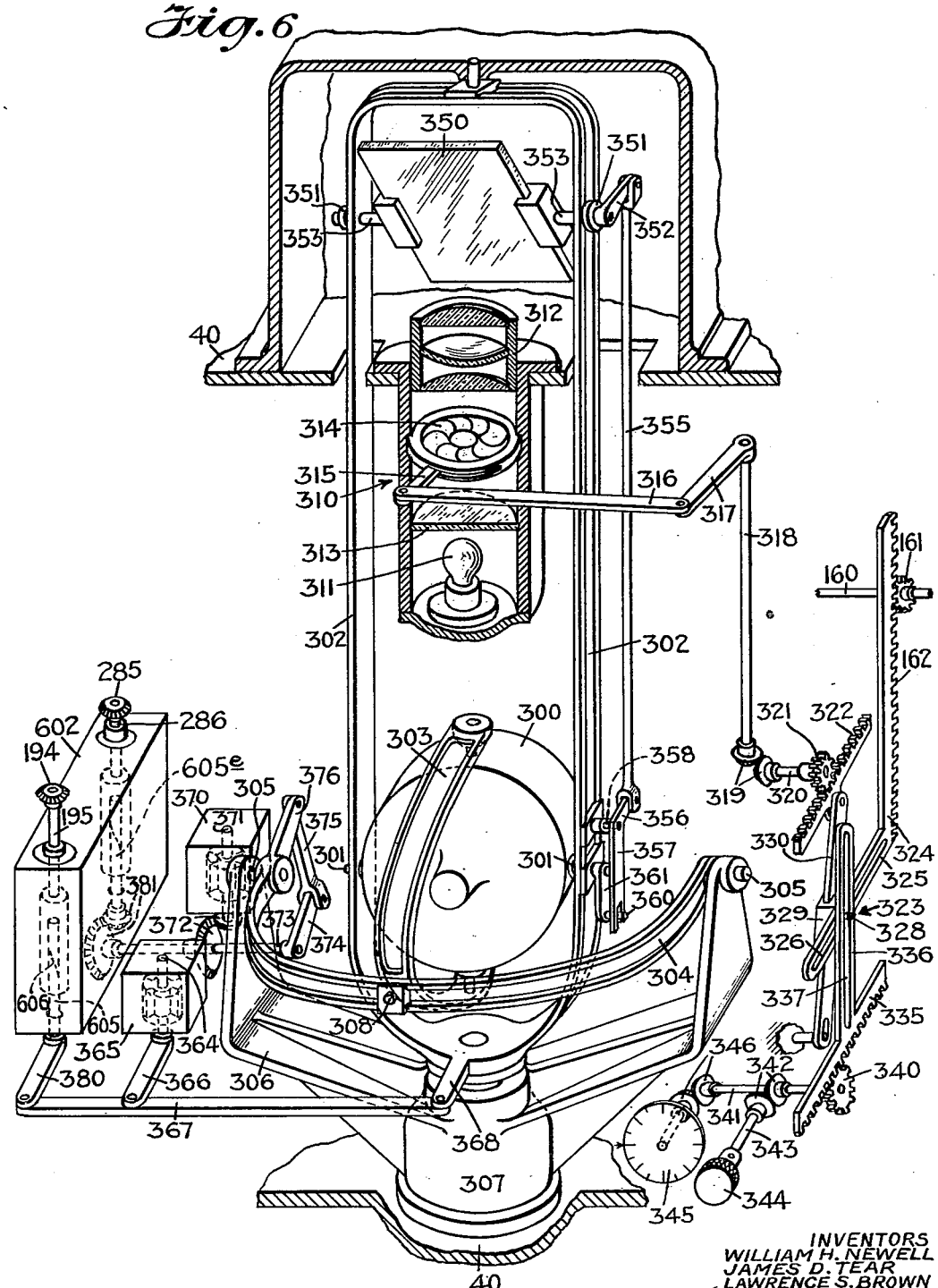
Fig. 6 is a diagram of the gyroscope and gyro-control mechanism including the range finder and sighting mirror.
Figure 7:
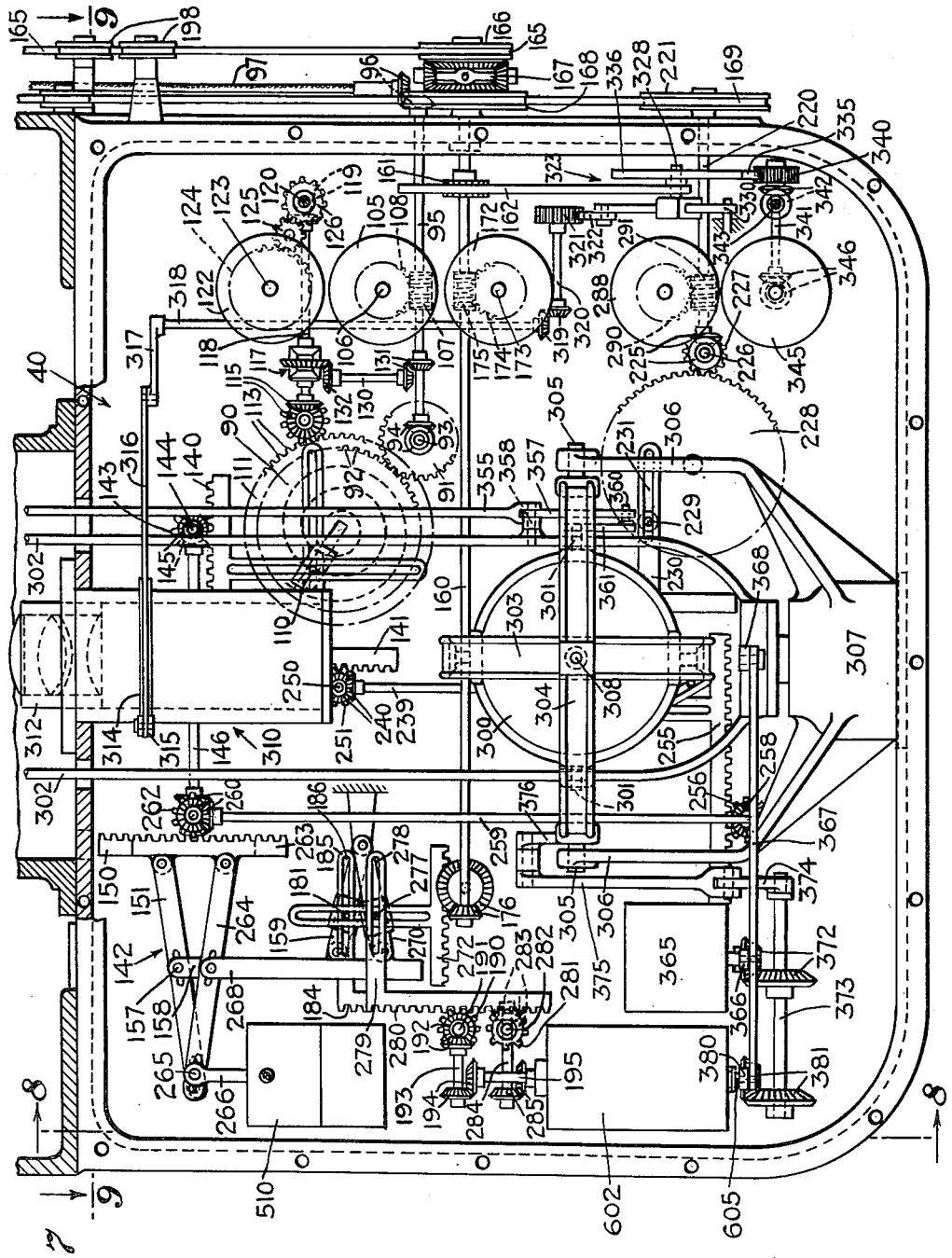
Fig. 7 is a front elevation of the control box with the cover removed to show the mechanism therein.

The gyrocontrol apparatus illustrated in Fig. 6 is of the general type disclosed in the copending application of William H. Newell, Ser. 503,510, filed Sept. 23, 1943, for Gyroscopically Controlled Optical Mechanism. This mechanism comprises a gyroscope 300 of standard construction including a casing which is attached by trunnions 301 to a train gimbal frame 302 and by a pivoted bail 303 to an elevation gimbal 304.

The elevation gimbal 304 is mounted by trunnions 305 in a bracket 306 which is fixed to a pedestal 307 attached to the box 40. The train gimbal frame 302 is pivotally mounted at its lower end in the pedestal 307 and at its upper end in the box 40 for rotation about a vertical axis. The bail 303 is connected to the elevation gimbal 304 by a pin 308.

A collimator unit 310 is mounted on the box 40 within the train gimbal frame 302 and in alignment with the vertical axis about which the train gimbal frame rotates.

The collimator unit 310 comprises a lamp 311 and a collimator lens system 312 which is arranged to direct the rays from the lamp 311 vertically upward. Interposed between the lamp 311 and the lens system 312 is a diffusing glass 313 and an iris diaphragm 314 which is adjustable in opening by means of an arm 315 to which a link 316 is pivotally attached.

The link 316 is also pivotally attached to an arm 317 carried by a shaft 318 which is connected through bevelled gears 319, shaft 320 and pinion 321 to a rack 322 which constitutes the output element of a range divider mechanism 323. One of the input elements of the range divider 323 comprises an L-shaped member 324 having as one leg the rack 162 which is driven by the pinion 161 of the range shaft 160 (Fig. 5) and having as the other leg a horizontal arm 325 provided with a slot 326 within which a pin 328 slides. The pin 328 is carried on a sleeve 329 which slides on a pivoted arm 330 connected to the rack 322. The other input member to the range divider comprises a rack 335 having a vertical arm 336 provided with a slot 337 in which the pin 328 slides. The rack 335 is actuated to represent target size by a pinion 340 mounted on a shaft 341 which is adjusted through bevelled gears 342 by means of a shaft 343 and an adjusting knob 344 which is accessible from the front of the box 40 as shown in Fig. 1. A target size dial 345 is driven by the shaft 341 through bevelled gears 346. The dial 345 is also visible from the front of the box 40 as shown in Fig. 1. The adjusting knob 344 is adapted to be adjusted in accordance with the known size of the target.

It is well known that with a stadia type range finder the range of the target is proportional to the width or size of the target divided by the subtended angle. The divider mechanism 323 performs this division. The position of the rack 322 represents the angle subtended by the target. The opening of the iris 314 is controlled from rack 322 to be proportional to the position of rack 322. The position of the range shaft 160 is adjusted by the gunner so that the image of the iris which he sees just encompasses the target. Having set the proper target size or width on the dial 345 the correct range will be introduced into the computing mechanism by shaft 160. For short ranges the time of flight may be considered as proportional to the range. Therefore, the value introduced into the deflection computing mechanism by shaft 160 may be considered as representing time of flight T.

Immediately above the collimator is a mirror 350 mounted on trunnions 353 by which it is pivoted to the train gimbal frame 302 in bushings 351 for tilting movement about a horizontal axis and controlled by an arm 352 which is attached to one of the trunnions 353. This mirror is partially silvered so as to be transparent and at the same time to reflect rays striking it from the collimator lens system 312. The mirror 350 is moved by the gyroscope 300 through a linkage comprising a link 355 pivotally connected to the arm 352 and to arm 356 of equal length. Arm 356 constitutes one arm of a bell crank lever having a second arm 357. The bell crank lever is pivoted on a trunnion 358 mounted on the frame 302 and is actuated by a pin 360 engaging a slot in the end of arm 357 and carried on an arm 361 attached to the trunnion 301 of the gyro-housing. The arm 361 is equal in length to the spacing between the gyro-trunnion 301 and the bell crank trunnion 358. By this arrangement the tilting movement of the gyro-housing about a horizontal axis produces a pivotal movement of the mirror 350 through one-half of the angle of movement of the gyroscope, so that the rays from the collimator 310 as reflected by the mirror always remain parallel to the spin axis of the gyroscope.

The precessing force for causing the gyroscope 300 to precess in elevation is applied through the shaft 364 of a hydraulic elevation precessing motor 365 to be described having an arm 366 attached to a link 367 which, in turn, is attached to an arm 368 carried by the train gimbal frame 302.

The train precessing force is applied by a train precessing motor 370 to be described, through a shaft 371, bevelled gears 372, shaft 373, arm 374, link 375 and arm 376 which is attached to the elevation gimbal 304.

Movement of the train gimbal frame 302 in train which corresponds to movement in train of the spin axis of the gyro 300, is transferred by the link 367 to an arm 380 attached to the hydraulic follow-up valve mechanism to be described. Movement of the spin axis of the gyro 300 in elevation is transferred from the elevation gimbal 304 through the shaft 373 and bevelled gears 381 to the elevation follow-up valve mechanism to be described. The mirror 350 is positioned in an upper projection of the box 40 in the line of sight of the observer as indicated in Figs. 1 and 2.

*Hydraulic system*

The hydraulic mechanism is shown in Figs. 10 to 15. The precessing control pressures are generated hydraulically by the control valves in valve block 57 shown in Figs. 1, 10 and 11. Referring to Figs. 11, 12, 13 and 18, the control handles 55 which are actuated by the gunner are shown as mounted on a horizontal shaft 400 which is pivoted in the bracket 56 for rotation about a horizontal axis and carries an arm 401, Fig. 13, which is attached by a pivoted link 402 to a slidable rod 403 which is located within the bracket 56 and carries a pair of collars 404 which actuate an arm 405 carried by a shaft 406. The shaft 406 in turn carries an arm 407 which is connected by a link 408 to a valve plunger 409 in a manner such that the valve plunger is shifted from a central position an amount corresponding to the rotational movement of the handles 55 about their horizontal axis. The position and rate of movement of the valve plunger 409 controls the operation of an elevation precessing pressure generating valve 410. The rotational position of the handles 55 corresponds to the elevation precession rates which are to be set up in the gyroscope 300, since, as will be explained, the position and rate of movement of the plunger 409 controls and is a measure of the precessing pressure which is generated by the valve 410 for actuating the elevation precessing motor. The pressures thus generated are controlled primarily in accordance with the position of the handles 55 but these pressures are modified somewhat due to the rate of movement of the handles.

Rotation of the handles 55 and shaft 400 about a vertical axis causes the bracket 56 to rotate and, in turn, to rotate a segment of a bevelled gear 412 which, through a bevelled rack 413 actuates a shaft 414 carrying an arm 415 which is attached by a link 416 to a valve plunger 418 which controls the operation of the train precessing pressure generating valve 420. The elevation precessing pressure generating valve 410 and the train precessing pressure generating valve 420 are similar in construction and are adapted to generate pressures corresponding to the axial displacement and rate of movement of the valve plungers 409 and 418 respectively.

FIGURE 11

Referring first to the valve 410, the block 57 is formed with a valve chamber 425 in which slides a sleeve 426. The plunger 409 slides axially within a bore in the sleeve 426. The sleeve 426 is provided with end surfaces forming with the respective ends of the chamber 425, pressure chambers 427 and 428 respectively. The chamber 427 is supplied with fluid from a constant pressure $P_1$ through a supply duct 429. The duct 429 contains an adjustable restriction formed by the adjusting screw 434, the end of which enters and partially closes the duct 429. The chamber 428 contains fluid under a pressure which is determined by the position and rate of movement of the sleeve 426 and which constitutes the elevation precessing pressure $P_e$ which is supplied by passage 430 to a duct 431. The end surfaces of the sleeve 426 are recessed to receive compression springs 432 and 433 which are seated within the chambers 427 and 428 respectively and serve normally to hold the sleeve 426 balanced in its mid-position, in which event the pressure in the chamber 428 will correspond to the pressure within the chamber 427. Chamber 428 communicates through a passage 440 with an annular chamber 441 formed in the plunger 409. Passages 442 and 443 in the sleeve 426 terminate at the plunger 409 on opposite ends of the chamber 441 so that these passages are normally closed by the plunger 409 when the plunger is in the center position as shown, but are respectively brought into communication with the chamber 428 through the chamber 441 and the passage 440 when the plunger 409 is shifted in one direction or the other from its center position. The passage 442 communicates with an annular chamber 445 formed around the periphery of the sleeve 426 and the passage 443 communicates with an annular chamber 446 similarly formed in the sleeve 426. The chamber 445 receives fluid under a constant pressure $P_2$ which is double the pressure $P_1$ and is supplied through a passage 447 in the block 57 which communicates with a supply duct 448 receiving fluid under the pressure $P_2$ from a suitable source to be described. The chamber 446 contains fluid under a low or zero pressure $P_0$ which may constitute the intake pressure of the pump. The chamber 446 communicates through a passage 449 with a return duct 450 which leads to the supply reservoir of the pump.

The pressure $P_1$ is supplied by a $P_1$ generator valve 455 formed in the block 57 and comprising a chamber having a slide 456 provided with end surfaces 457 and 458 forming end chambers 459 and 460 respectively. The end surface 457 is formed with one half of the area of the end surface 458 so that when the slide 456 is in balanced position the pressure within the chamber 460 will be half that within the chamber 459.

The chamber 459 is connected to the passage 447 containing fluid under pressure $P_2$ by means of a passage 462. The slide 456 is formed with an annular chamber 463 which communicates through a passage 464 with the passage 429 to supply fluid under the pressure $P_1$ thereto. The annular chamber 463 communicates with the chamber 460 by means of a passage 465 in the slide.

The slide 456 is provided with a reduced diameter end portion 470 terminating at the surface 457 above mentioned and has an annular end surface 471 surrounding the end portion 470. This annular surface 471 forms with an intermediate end wall of the valve chamber an annular chamber 472. The annular chamber 472 communicates through a passage 473 with the passage 449 containing fluid under return pressure $P_0$. The passage 473 terminates at the slide 456 adjacent one end of the chamber 463 so that it is normally closed by the slide. A passage 475 communicates from the passage 462 to the valve chamber on the opposite end of the annular chamber 463 so that when the slide 456 is in its mid position the passages 475 and 473 are both closed. The fluid pressures in the two end chambers 459 and 460 are then balanced and, due to the differences in area of the end surfaces, the pressure $P_1$ is generated at exactly one-half of the pressure $P_2$. If the pressure $P_1$ should, however, vary from this amount, the pressure within the chamber 460 would likewise vary, thereby unbalancing the slide 456. If the pressure in the chamber 460 is reduced, for example, the pressure $P_2$ in the chamber 459 causes the slide 456 to move upwardly, thereby establishing communication from the passage 475 through the chamber 463 to the passage 465, thereby introducing fluid from the passage 475 into the passage 465 and increasing the pressure in the latter passage. The pressure will thus be built up until the pressures in the chambers 459 and 460 are again balanced at which time the slide 456 returns to its mid position and cuts off further fluid from the passage 475.

If, on the other hand, the pressure within the chamber 460 increases, the slide 456 will be forced downwardly establishing a communication from the passage 465 through the chamber 463 to the passage 473, thereby bleeding off some of the fluid within the passage 465 into the return duct 450. This will likewise continue until the pressure in the chamber 460 is reduced to $P_1$, at which time a balance is again established. In this way the pressure in the passage 464 is maintained at exactly one-half of the pressure $P_2$ in the duct 448.

OPERATION OF FIG. 11

In the operation of the elevation precessing pressure generating valve 410, beginning with the valve plunger 409 in the position shown, the pressure in the chamber 428 is exactly balanced against the pressure $P_1$ in the chamber 427. The precessing force $P_e$ accordingly is the same as $P_1$. If now the gunner rotates the handle 55 about the horizontal axis for producing a precessing rate in elevation, the valve plunger 409 will be moved axially in one direction or the other. Assuming, for example, that the plunger 409 is moved upwardly, the chamber 441 is brought into communication with the passage 442 and fluid under pressure $P_2$ is supplied through the chamber 441 and passage 440 to the chamber 428, thereby increasing the pressure in the chamber 428 and disturbing the balance between the chambers 427 and 428. This increased pressure in the chamber 428 causes the valve sleeve 426 to move upwardly, thereby compressing the spring 432 and reducing the compression on the spring 433. This increase in pressure in chamber 428 causes the sleeve 426 to follow the plunger 409 upwardly until the sleeve has again reached a position relative to the plunger 409 at which the passage 442 is closed off. If the sleeve should move past this closing position, then communication would be established between the chamber 428 and the passage 443 which would remove some of the fluid from the chamber 428 to the return passage 449 and would correspondingly reduce the pressure on the lower end of the valve sleeve 426. When a new position of rest has been reached, the pressure within the chamber 428 plus the pressure of the spring 433 will exactly equal the pressure in the chamber 427 plus the pressure of the spring 432. The upward displacement of the two springs, however, represents a net downward pressure on the sleeve 426 proportional to the displacement of the sleeve 426 from its mid-position. This downward pressure of the springs acting on the sleeve 426 is reflected as an increase in hydraulic pressure in the chamber 428 and in the pressure of the fluid $Pe$ in the passage 430 and in the duct 431 which communicates therewith. This increase in hydraulic pressure is thus primarily proportional to the amount of vertical movement of the plunger 409 and the corresponding movement of the slide 426.

The restriction formed by the screw 434 in duct 429 restricts the flow of fluid from the chamber 427 and therefore the pressure in chamber 427 becomes higher than the normal $P_1$ pressure during upward movement of the slide 426. This higher pressure in chamber 427 results in a further increased pressure in the chamber 428 during upward movement of the slide 426. The effect of this transient change of pressure is to temporarily modify the rate of precession of the gyroscope to thereby correct the position of the gyroscope and cause the line of sight to get back on the target. It is evident that the reason the gunner moves the handles 55 is because the line of sight has gotten off the target. The effect of this modification of the precessing pressure is to aid the gunner in tracking the target since it is not necessary for him to set up excessive precession rates in order to bring the line of sight on the target. The relative amount by which the precessing pressure is thus modified by the rate of movement of the handles 55 may be varied to suit the operator by adjusting the screw 434.

Movement of the plunger 409 in a downward direction reverses the above mentioned operation, establishing communication between the chamber 428 and the return passage 449 and thereby reducing the pressure in the chamber 428 to establish a pressure differential between the chambers 427 and 428 which causes the sleeve 426 to follow the plunger 409 downwardly. In this way the pressure within the chamber 428, and within the duct 431 which is supplied thereby, is caused to increase or decrease from the normal pressure $P_1$ by an amount determined by the amount and rate of movement of the plunger 409 from its central position. The resultant pressure $Pe$ established in the duct 431 accordingly represents the direction and amount of the precessing force which is to be applied to the gyroscope and also represents the elevation rate $dE$ which is to be set into the automatic computing mechanism.

The construction of the valve 420 is identical with that of the valve 410. The description will accordingly not be repeated. The parts of the valve 420 have, however, been given corresponding reference characters with the addition of a $t$ to indicate that they apply to the train precessing pressure generating valve. The chamber 428$t$ communicates through the passage 430$t$ with a duct 480 which carries fluid under pressure $Pt$ which represents the train precessing force to be applied to the gyroscope and the train $dBs$ which is to be set into the automatic computing mechanism.

Rotational movement of the handles 55 and the shaft 400 about the vertical axis of the bracket 56 causes a corresponding axial movement of the plunger 418 which is followed by the sleeve 426$t$ to generate the pressure $Pt$ in the chamber 428$t$ which varies from the pressure $P_1$ in a direction and by an amount determined by the direction, amount and rate of rotational movement of the bracket 56. This movement corresponds to the rate of train which the gunner desires to set into the gyro-control apparatus.

Referring to Fig. 10, the $Pt$ supply duct 480 and the $Pe$ supply duct 431 are shown as connected respectively to passages 485 and 486 in a bearing block 487 in which the trunnion 43 is journalled. The $P_2$ supply duct 448 is connected by a pipe 488 to a passage 490 in the block 487. The $Po$ return duct 450 is connected by a duct 491 to a passage 492 in the bearing block 487.

The passages 492, 485, 490 and 486 communicate with annular channels 494, 495, 496 and 497 respectively in the trunnion 43. These channels connect through passages 500, 501, 502 and 503 respectively in the trunnion 43, to ducts 505, 506, 507 and 508 respectively which lead to rate amplifier valves in a rate amplifier valve block 510 which is located in the control box 40 (Fig. 1) and which is shown in Fig. 5 as connected to apply the train and elevation rates to the computing apparatus. The ducts 506 and 508 are also connected respectively by ducts 512 and 513 to supply pressures $Pt$ and $Pe$ respectively to precession force motors 370 and 365 respectively which are shown in Fig. 6 as connected to apply the train precessing force and the elevation precessing force to the gyroscope.

FIG. 14

Referring now to Fig. 14, the rate amplifier valve block 510 is shown as containing train rate amplifier valve 520, elevation rate amplifier valve 521 and a $P_1$ generator 522 which is designed to generate a pressure $P_1$ corresponding to the pressure $P_1$ generated by the generator 455 of Fig. 11.

Inasmuch as the $P_1$ generator 522 is identical in construction with the $P_1$ generator 455, the corresponding parts have been given identical reference characters with the addition of a prime and will not be redescribed. Fluid under pressure $P_2$ is supplied to the chamber 459′ of the generator 522 from the $P_2$ supply duct 507 through a passage 523. Return fluid at a pressure $Po$ is fed to the return duct 505 through a passage 524 from the valve chamber 472′. Fluid under pressure $P_1$ is supplied from the valve chamber 460′ to a passage 525.

The elevation rate amplifier valve 521 comprises a chamber formed in the valve block 510, containing a sleeve 530 and a slide valve 531 which is mounted for axial movement within the sleeve 530. Chambers 532 and 533 are formed at the two ends of the sleeve 530. The chamber 532 is supplied with fluid at pressure $P_1$ through a passage 534 which communicates with the passage 525. Chamber 533 is supplied with fluid at a pressure controlled by the operation of the slide valve 531 through a passage 535 communicating with an elongated chamber 536 in the sleeve 530.

The slide valve 531 is acted upon at one end by the hydraulic pressure $P_1$ from the chamber 532 and at its other end forms a closure for a chamber 537 formed within the bore of the sleeve 530. The slide valve 531 is acted upon by two opposed springs 538 and 539. The spring 538 extends between one end of the slide valve 531 and a ring 540 attached to the sleeve 530 within the chamber 537. The spring 539 extends between the opposite end of the slide valve 531 and a pin 541 which is mounted in a fixed plate 542 forming an end closure for the chamber 532. The pin 541 is adjustable for varying the tension of the spring 539. The slide valve 531 is formed with a central annular chamber 545 which communicates through a passage 546 in the sleeve 530 with the chamber 536 and is thus in communication with the end chamber 533.

Fluid under pressure $P_2$ is supplied through a passage 550 from a passage 551 which communicates with the duct 507, to an elongated chamber 552 formed in the sleeve 530 and thence to a passage 553 which terminates adjacent the lower end of the chamber 545 and is normally closed by the slide valve 531.

Fluid at the pressure $P_o$ is returned from the valve 521 to the return duct 505 through a passage 555 in the valve block 510, which passage is connected to the slide valve 531 through a passage 556 in the valve block 510 leading to an elongated chamber 557 in the sleeve 530, thence through a passage 558 in the sleeve 530 which passage terminates adjacent the upper end of the chamber 545 and is normally closed by the slide valve 531. The passages 553 and 558 are so arranged that one or the other is brought into communication with the chamber 545 when the slide valve 531 moves axially from its balanced position.

Fluid under pressure $P_e$ is supplied from duct 508 through passage 560 in the valve block 510 to an elongated chamber 561 in the sleeve 530, thence through a passage 562 in the sleeve 530 which communicates with the chamber 537.

The link 266 which connects to the automatic computing apparatus is connected to the sleeve 530 and extends outwardly from the valve block 510.

The speed of response of the sleeve 530 to movements of the valve 531 is controlled by an adjusting screw 565 which extends into the passage 535 and controls the flow of fluid therethrough. The effect on the sleeve 530 of sudden changes in the precessing pressure due to the rate of movement of the handles 55 is eliminated to a large extent because of the restricted flow through passage 535. A stop screw 566 carried by the sleeve 530 extends into the chamber 545 to limit the axial movement of the slide valve 531 relative to the sleeve 530.

Assuming that the pressure $P_e$ equals the pressure $P_1$, then the pressure within the chamber 537 will equal the pressure in the chamber 532 and the forces on the two ends of the slide valve 531 will be balanced. The valve will then take a position at which the pressures of the springs 538 and 539 are also balanced and the sleeve 530 will be in a position relative to the slide valve 531 such that the passages 558 and 553 are both closed, as shown in Fig. 14.

If now the pressure $P_e$ is assumed to increase, the pressure in chamber 537 becomes greater than the pressure $P_1$ in chamber 532 and the slide valve 531 is caused to move downwardly thereby increasing the tension of spring 538. This downward movement of the slide valve 531 opens the passage 553 to the chamber 545 and allows fluid under pressure $P_2$ to pass from the passage 550 through the chamber 545 and the passage 535 to the chamber 533. This increases the pressure in the chamber 533 and causes the sleeve 530 to move downwardly. This action continues until the downward movement of the sleeve 530 with respect to the slide valve 531 again centers the sleeve with respect to the valve and closes the passage 553. As the sleeve 530 thus follows the movement of the valve 531, the tension of the spring 538 is restored to normal. The valve 531 and the sleeve 530 move down together, except for the effect of the restriction in passage 535 caused by the screw 536, until the tension of the spring 539 is reduced by an amount corresponding to the increase in the pressure $P_e$ in chamber 537. Since the pressure in the chamber 532 and tension of the spring 538 remain at their normal values, the valve 531 and the sleeve 530 assume a position where the increased effect of the pressure in chamber 537 tending to move the valve 531 down is neutralized by the reduced effect of the spring 539.

The sleeve 530 accordingly not only follows the movement of the slide valve 531, but, due to the large area of the end of the sleeve 530 as compared to the area of the ends of the slide valve 531, exerts an increased force which may be applied by the link 266 to the input of the computing mechanism as above described. The ratio of the force exerted by the link 266 to that exerted upon the slide valve 531 may be varied as desired by changing the relative dimensions of the parts. Hence, the sleeve 530 may be caused to exert any necessary force upon the link 266 for actuating the computing mechanism.

As explained, the movement of the slide valve 531 and the sleeve 530 is proportional to the changes in pressure $P_e$. Hence the position represents the rate which is to be applied to precess the gyroscope, and therefore the position of the link 266 also represents the rate of elevation $dE$ and actuates the elevation differential arm 264 as indicated in Fig. 5.

It will be noted that the position taken by the link 266 is dependent only upon the pressure $P_e$ and is not affected by leakage in the hydraulic system provided the leakage does not change the pressures. For any position of the plunger 409 there is an exact corresponding position for the link 266 which is determined by the spring and hydraulic pressures only, provided of course the hydraulic system has sufficient capacity to keep the various passages and ducts full at the various pressures.

The elements of the train rate amplifier valve 520 are identical with those of the elevation rate amplifier valve above described and have accordingly been given the same reference characters with the suffix $t$. Fluid under a pressure $Pt$ is supplied to the train rate amplifier valve from the duct 506 through a passage 570 in the valve block 510. This causes a movement of the slide valve 531t which is proportional to changes in pressure Pt and a corresponding movement of the sleeve 530t which actuates the link 155 to introduce the rate of train dBs into the computing mechanism as described in connection with Fig. 5.

Pressures Pt and Pe are supplied to the train and elevation precessing force motors 370 and 365 by the ducts 512 and 513 respectively. The motor 370 comprises a block 580 having two arcuate chambers in which vanes 581 and 582 are positioned. These vanes separate the arcuate chambers into Pt chambers 583 and 584 respectively and $P_1$ chambers 585 and 586 respectively. The $P_1$ chambers are in communication through a passage 587 in the hub 588 carrying the vanes 581 and 582. The Pt chambers 583 and 584 are likewise in communication through a passage 589 in said hub. The chamber 583 communicates through a passage 590 in the block 580 with the Pt duct 512. The chamber 585 communicates through a passage 591 in block 580 with a duct 592 which communicates with a passage 593 in the block 510 and thence through the passage 525 with the chamber 460' of the $P_1$ generator 522. When the pressure Pt equals the pressure $P_1$ the pressures in the various chambers of the motor 370 are balanced and no precessing torque is applied by the motor. If, however, the pressure Pt varies from the pressure $P_1$, a corresponding torque is produced which is applied to the shaft 371 of Fig. 6 and thence through the bevelled gears 372 and the linkage mechanism above described to the elevation gimbal 304, to apply a torque to a gyroscope 300 which causes the same to precess about its vertical axis. The rate of precession thus produced corresponds to the force supplied. Hence the rate of train of the gyroscope is proportional to the pressure Pt which, in turn, is determined by the angular position and rate of movement of the handles 55 about the axis of the bracket 56 (Fig. 11).

The elevation precessing force motor 365 is similar to the motor 370. The corresponding parts have accordingly been given corresponding reference characters with the suffix e to indicate elevation precession force. In a manner similar to that above described, a torque is produced in the hub 588e which is applied by the shaft 364 to the link 367 as shown in Fig. 6. This link applies the torque to the train gimbal frame 302 which causes the gyroscope 300 to precess in elevation.

The spiral follow-up valves 600 and 601 in valve block 602, which are shown in Figs. 6 and 14 are of the general type disclosed in the application of James D. Tear, Ser. 483,835, filed Apr. 21, 1943 for Motion Reproducing Mechanism. The train follow-up valve 601, for example, comprises a cylindrical shaft 605 which is actuated by the arm 380 (Fig. 6) connected by the link 367 to the train gimbal frame 302 of the gyroscope so that the valve shaft 605 follows the precessional movement in train of the gyroscope. This shaft 605 contains a spiral groove 606 for the purpose to be described.

The valve 601 also includes a sleeve 607 which is mounted in the valve chamber for both rotational and axial movement with respect to the valve shaft 605. The sleeve 607 is keyed to the enlarged portion 608 of the shaft 195 to permit relative axial movement of the sleeve with respect to the latter shaft. The shaft 195 is journalled for rotation in a frame 609 attached to the valve block 602 and carries the bevelled gear 194 as indicated in Figs. 5 and 6, which is connected to the output of the computing mechanism and is thereby set in accordance with the computed deflection Ds (Equation 1). The valve shaft 605 is restrained against axial movement by a bearing strip 610, which is attached to the valve block 602. Chambers 611 and 612 are formed at opposite ends of the sleeve 607. The chamber 611 communicates through a passage 614 in the sleeve 607 with annular passages 615 and 616 which are disposed around the valve shaft 605 so as to communicate with groove 606 in the shaft 605 in all relative positions of the sleeve and shaft. A passage 620 in the sleeve 607 is normally closed by the shaft 605 and communicates with an annular chamber 621 in the sleeve 607 which, in turn, communicates with a passage 622 in the valve block 602 which is connected by duct 623 to the supply duct 507 supplying fluid under pressure $P_2$.

A passage 630 in the sleeve 607 is normally closed by the valve shaft 605 and communicates through a passage 631 with an annular chamber 632 in said sleeve which communicates through a passage 633 in the valve block 602 with a duct 634 connected to the duct 505 carrying fluid under the return pressure Po.

The arrangement is such that with the valve shaft 605 and sleeve 607 in their normal positions as shown in Fig. 14 the passages 620 and 630 are both closed by the shaft 605. Rotation of the shaft 605 in either direction from its normal position, however, establishes communication from either the passage 620 or the passage 630, according to the direction of rotation, to the spiral groove 606 in the shaft 605 and thence through the passage 614 to the chamber 611. Hence, rotation of the shaft 605 in one direction supplies fluid under pressure $P_2$ to the chamber 611, whereas rotation of the shaft 605 in the opposite direction establishes communication between the chamber 611 and the fluid return duct to withdraw fluid from the chamber 611, thereby causing axial movement of the sleeve 607 in one direction or the other depending upon the direction and the amount of rotation of the shaft 605. The sleeve 607 is thus shifted axially along the shaft 605 in a manner corresponding to the movement of a nut along a threaded bolt. This axial movement of the sleeve 607 changes the volume of the chamber 612. This chamber 612 communicates through a passage 640 in the valve block 602 with a duct 641 which leads to the trunnion 44 as shown in Fig. 10 and carries a fluid the flow of which corresponds to the variations in volume $V_t$ in the chamber 612 and, as will be described, controls the rate of train of the gun mount so that the train of the mount corresponds to the train precessional movement of the gyroscope.

A tube 642 is carried by the sleeve 607 parallel to the axis of rotation thereof and is stationary with respect to the axial movement of the sleeve but rotates herewith. A slot 643 in the tube 642 is disposed so as to come into communication with either the chamber 621 or the chamber 632 as the sleeve moves from its mid-position. The tube 642 has a restricted opening 644 communicating with the chamber 612. The rate of flow through the opening 644 is proportional to the axial displacement of the sleeve from its normal position. This displacement corresponds to the lag or lead in train of the gun mount relative to the train of the gyroscope and represents acceleration.

The rate of flow through the opening 644 therefore represents acceleration and the accumulated amount of flow represents accumulating change in speed of the gun mount. In other words, the flow through the opening 644 represents an integration of acceleration and effects change of speed, all as more fully set forth in the copending application 483,835 above mentioned.

It will be noted that rotation of the valve shaft 605 in either direction relative to the sleeve 607, resulting from the precessional movement of the gyroscope in train relative to the control box 49, connects the chamber 611 either to pressure or to exhaust P2 or P0 and causes axial movement of the sleeve 607, which, in turn, changes the volume in the chamber 612 and produces a flow through the duct 641. This flow through duct 641 is used by means to be described to cause train movement of the turret or gun mount which contains the above described mechanism. As the turret moves in train the box 49 and the mechanism therein are caused to follow the precessional movement of the gyroscope so that the link 367 causes the valve shaft 605 and the sleeve 607 to be returned to their normal positions relative to the valve block 602, but only after the flow through the opening 644 has changed the rate of train and the position of the turret to agree with the precessional rate and position of the gyroscope. The operation of the control is such that the turret follows the gyroscope in train with a displacement therefrom proportional to the acceleration plus the deflection Ds by which the sleeve 607 has been turned relative to the valve block 602 by shaft 195. The manner in which the displacement for the deflection is effected will be explained hereinafter.

The construction and operation of the valve 600 are similar to that above described. Hence, the corresponding parts have been given corresponding reference characters with the suffix $e$. The shaft 605$e$ is driven by bevelled gears 381 as shown in Fig. 6 which are rotated by the elevation gimbal 304 of the gyroscope. The chamber 612$e$ is connected by passage 640$e$ to duct 641$e$ carrying the elevation response volume $V_e$ which varies in accordance with the angular movement of the shaft 605$e$ and consequently with the precession of the gyroscope in elevation.

Referring to Fig. 10, the duct 641 is connected through the passage 650 in the trunnion 44 to an annular chamber 651 in the trunnion then by a passage 653 in the trunnion housing 652 to duct 654 supplying the response volume $V_t$ to the train hydraulic variable speed transmission to be described.

The duct 641$e$ connects through a passage 655 in the trunnion 44 to an annular chamber 656, then through a passage 657 in the trunnion housing 652 to a duct 658 which supplies a response volume $V_e$ to the hydraulic elevation variable speed transmission to be described.

FIG. 15

Figure 15:
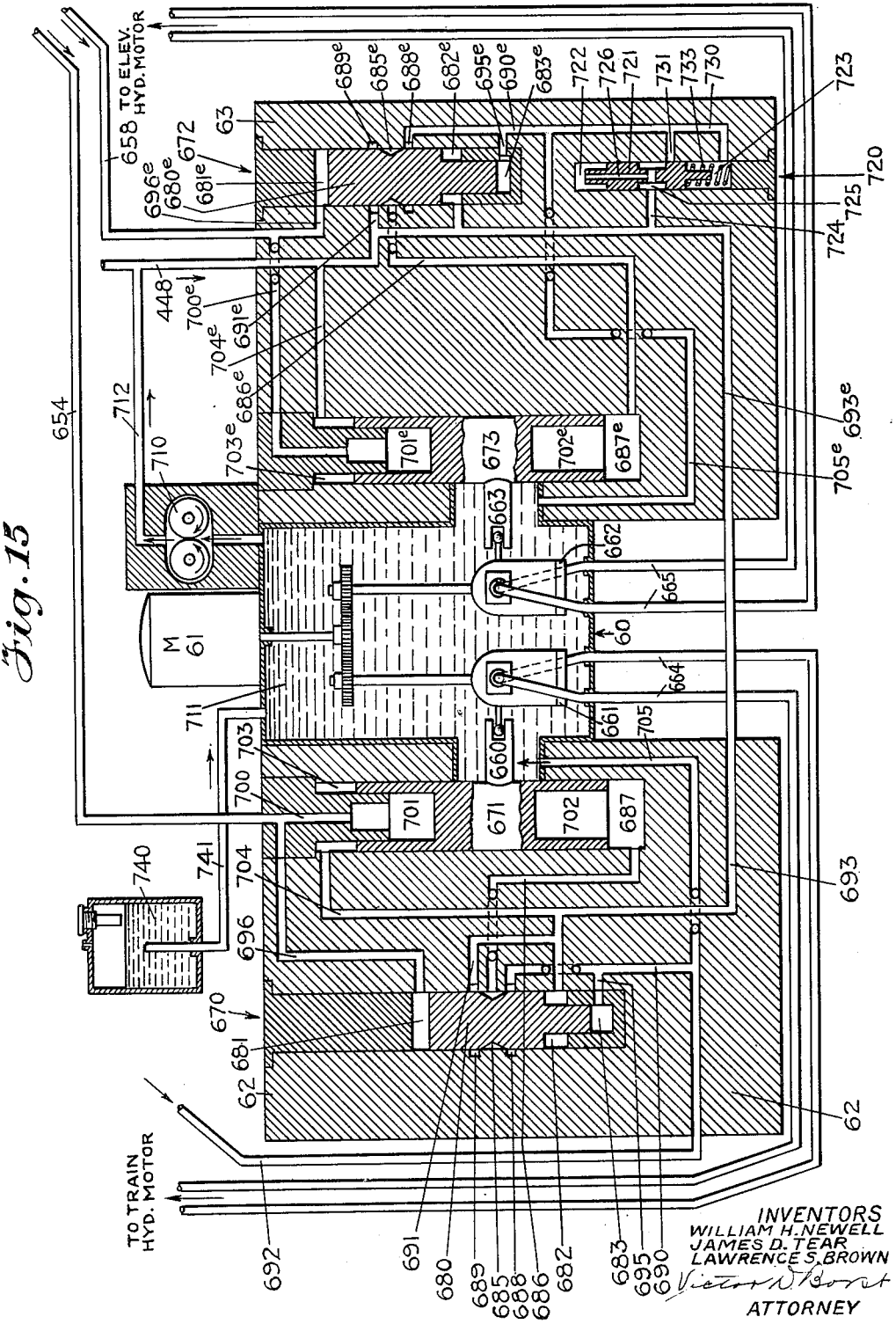
Fig. 15 is a sectional view through the pump block of the variable speed hydraulic transmission showing the control valves and the hydraulic connections.

Referring now to Fig. 15, a pair of variable displacement pumps of variable reversible hydraulic transmissions are shown. The pumps are of a well known form and are driven at a constant speed and supply fluid at a variable rate determined by the position of a tilting box or control element so that the direction and amount of flow is proportional to the direction and amount of movement of the control element from its mid-position. The transmission may be of the type known as a Waterbury gear or as a Vickers transmission.

More specifically, referring to Fig. 15, the motor 61 drives hydraulic pumps 661 and 662 at a constant speed. The output of the pump 661 is controlled by an arm 660 and the output of the pump 662 is controlled by an arm 663 in a manner such that the rates of fluid output and the direction of flow are determined by the positions of the arms 660 and 663 with respect to their mid-position. The ducts 664 lead from the output of the pump 661 to the reversible train motor 65 shown in Fig. 1 and the ducts 665 lead from the output of the pump 662 to the reversible elevation motor 30 shown in Fig. 1. These motors drive the turret in train and the gun mounts 12 and 13 in elevation as previously described.

The train response volume duct 654 leads to a train relay or pilot valve 670 and a train pump control power unit 671. The elevation response volume duct 658 leads to an elevation relay or pilot valve 672 and an elevation pump control power unit 673. These valve and power units are of the general type disclosed in the copending application Ser. No. 483,835 above mentioned. Referring first to the train control system, the train pilot valve 670 comprises a valve slide 680 forming with the valve block 62 a response chamber 681, a pressure chamber 682 and an exhaust chamber 683. The area of the slide 680 in contact with the pressure chamber 682 is preferably one-half of the area in contact with the response chamber 681 so that the valve will be balanced when the pressure of the fluid in the duct 654 is one-half of the pressure $P_2$ or equals $P_1$.

The valve slide 680 is provided with an annular chamber 685 communicating with a passage 686 in the valve block 62 which supplies fluid to a chamber 687 of the power unit 671. Annular chambers 688 and 689 in the valve block 62 communicate through passages 690 and 691 with a duct 692 leading to the return duct 491 and with a passage 693 connected through a corresponding passage 693$e$ in valve block 63 to the duct 448 carrying fluid under pressure $P_2$, respectively. The chambers 688 and 689 are positioned so that they are normally closed by the valve slide 680 when the latter is in its mid position. Movement of the valve slide in either direction, however, will establish communication between the chamber 685 and either the chamber 688 or the chamber 689 depending upon the direction of movement of the valve slide. This opens the passage 686 either to pressure $P_2$ or exhaust $P_0$ and causes a corresponding flow of fluid to or from the chamber 687 at one end of the power unit 671. The chamber 683 of the valve 670 communicates through a passage 695 with the exhaust passage 690. The chamber 681 communicates through a passage 696 with the duct 654.

The duct 654 also communicates through a passage 700 with chamber 701 of the power unit 671. The power unit 671 comprises a piston 702 forming the power chamber 687 and the response chamber 701 at opposite ends thereof and also having a surface forming a pressure chamber 703 at the same end as the response chamber 701. The chamber 703 is in communication through a passage 704 with the pressure passage 693 supplying fluid under pressure $P_2$. The passage 690 communicates through a passage 705 with the supply reservoir 711 of the pumps 661 and 662 for supplying return fluid thereto.

The piston 702 maintains a position determined by the balance in pressure in the chambers 701 and 703 on one end and the chamber 687 on the other end. When the piston 702 is in its mid position, the arm 660 is in a position such that no flow is produced by the pump 661.

Assuming that the system is balanced in the position shown in Fig. 15 with the arm 660 in its mid position and with the normal pressure in the response volume duct 654, if now the response volume changes so that the pressure in the line 654 is increased, an increased pressure is supplied to the chamber 681 which causes the valve slide 680 to move downwardly, thereby establishing communication between the passage 686 and return passage 690 and thus reducing the pressure in the chamber 687 of the power unit 671. This causes the piston 702 to move downwardly in response to the pressure $P_2$ in chamber 703. Downward movement of the piston 702 increases the volume of the response chamber 701 and thereby relieves the pressure in the chamber 681 to permit the valve slide 680 to move upward. This upward movement continues until the volume in the chamber 681 is restored to its original value to permit the slide 680 to return to its mid position and cut off further flow of fluid to or from the chamber 687. The piston 702 is then in a new position and the arm 660 is shifted to a position to cause a corresponding flow to be supplied by the pump 661 and thence through the line 664 to the train motor. In its new position the piston 702 is displaced from its mid position by an amount such that the change in volume of the response chamber 701 is equal to the accumulated volume of liquid which has passed through the opening 644 in the train follow up valve 601. The train motor will continue to operate at this rate until the piston 702 is moved by a change in pressure in the line 654 and the corresponding change in volume of fluid in the response chambers which as pointed out above, is effected by followup movement of the valve sleeve 607 of Fig. 14. The system accordingly operates to cause the turret to follow the gyroscope and to maintain a position in train corresponding to the position taken by the spin axis of the gyroscope.

The construction and operation of the elevation relay valve 672 and pump control power unit 673 and associated mechanism is similar to that above described. The corresponding parts have accordingly been given corresponding reference characters with the suffix e to indicate elevation control. The arrangement of valve 672 and the unit 673 is such that a change in pressure in the duct 658 carrying the elevation response volume Ve produces a movement of the arm 663 to cause the pump 662 to supply fluid to the ducts 665 which causes operation of the elevation motor 30. The gun mounts 12 and 13 are thus caused to follow the gyroscope in elevation and to maintain the guns at an angular position corresponding to the position of the gyroscope.

The computed deflections are set into the shafts 195 and 286 of follow-up valves 601 and 600 respectively as shown in Figs. 5 and 14 to cause a corresponding angular rotation of the valve sleeves 607 and 607e. Hence, the movement of the guns corresponds to the movement of the valve shafts 605 and 605e which are actuated by the gyroscope, plus the movement of the sleeves 607 and 607e which represent the computed deflection by which the guns must be offset from the line of sight.

The pressure $P_2$ is shown as developed by a suitable pump such as a gear pump 710 receiving fluid from the reservoir 711 of the pumps 661 and 662 and supplying fluid through the duct 712 to the $P_2$ duct 448 which supplies fluid under pressure $P_2$ to the various operating mechanisms above described. This pressure $P_2$ is regulated by a pressure regulating valve 720 having a valve slide 721 forming a pressure chamber 722 at one end and an exhaust chamber 723 at the other end. The chamber 722 is in communication with the duct 448 by means of a passage 724 and the passage 693e in the valve block 63. The passage 724 communicates with an annular chamber 725 formed in the slide 721 and having a passage 726 communicating with the chamber 722. Return fluid under pressure $P_0$ is taken through return passage 730 communicating with chamber 723 and with a passage 731 forming a port which is normally closed by the valve slide 721. The valve slide 721 is biased upward by means of a spring 733. The construction is such that the valve slide 721 is normally held in a position to close the port 731 by means of the spring 733 acting against the pressure in the chamber 722. If, however, the pressure in the passage 724 increases, an increased pressure is applied to the chamber 722 which causes the valve slide 721 to move downwardly, thereby establishing a communication between the chamber 725 and the port formed by passage 731 and allowing fluid in the passage 724 to be returned through the passage 731 and passage 705e to the reservoir 711. The arrangement is such that the slide 721 by opening or closing the port of passage 731, may be caused to maintain a substantially constant pressure $P_2$ of any desired value in the duct 448. This pressure may be adjusted by suitable adjustment of the spring 733.

Make-up fluid is supplied to the reservoir 711 by a supply reservoir 740 through a duct 741.

OPERATION

In the operation of this device, the gunner sits on the seat 80, Fig. 3 and views the target through the mirror 350 which is mounted in the upper part of the control box 40 as shown in Fig. 1. A spot of light from the collimator lens system 310 is seen reflected from the mirror 350. The gunner, observing an enemy plane, makes an adjustment corresponding to the known speed of his own ship by the knob 121 which appears on the front of the box 40. He then recognizes the type of the enemy plane and makes an adjustment of the divider mechanism 323, which controls the size of the iris 314 in the collimator unit 310, in accordance with the known wing spread of the enemy plane by means of the knob 344 which is also conveniently located on the front of the control box 40. The gunner then actuates the handles 55 about both vertical and horizontal axes so as to apply the precessional forces to the gyroscope for causing the gyroscope to precess in a manner to maintain the target in the center of the light spot on the mirror 350. At the same time he operates the foot pedals 208 and 209 (Fig. 2) to adjust the iris diaphragm 314 (Fig. 6) so as to maintain the light spot at a size to exactly encompass the target. If the target is moving past the gunner at a uniform rate, the control handles 55 will remain stationary after this rate has once been set into the gyroscope because the precessional force applied to the gyroscope will remain constant and will cause the gyroscope to continue to precess at a uniform rate as long as the handles 55 remain in their adjusted position. If, however, the speed of the target should change, corresponding adjustment of the handles 55 will be made by the gunner to maintain the target in the center of the reflected spot of light. At suitable times the gunner then presses the firing buttons on the handles 55 which actuate firing mechanism to fire the guns 10 and 11.

Referring now to Fig. 11, rotational movement of the handles 55 about the horizontal axis of the shaft 400 operates through the linkage including the rod 403 and the shaft 406 to cause corresponding vertical movement of the valve plunger 409 which, through the follow-up action of the valve slide or sleeve 426, causes a corresponding increase or decrease of pressure in the chamber 428, which resulting pressure constitutes the elevation control pressure Pe and is applied to the duct 431 and thereby to the control apparatus.

In a similar manner, rotation of the handles 55 and the shaft 400 about the vertical axis of the bracket 56 operates through the gear train including the bevelled gears 412 and 413 and the shaft 414 to cause vertical movement of the valve plunger 418. This movement of the plunger 418 causes the sleeve 426t to effect a corresponding movement and to thereby vary the pressure in the chamber 428t which is applied to the duct 480 as the train control pressure Pt.

Referring now to Fig. 14, it will be noted that the pressure Pe is supplied through the duct 508 to the elevation rate amplifier valve 521 and through the duct 513 to the elevation precessing force motor 365. The pressure applied to the precessing force motor 365 operates through the link 367 (Fig. 6) to apply a torque to the train gimbal frame 302 which causes the gyro 300 to precess in elevation. In a similar manner, train control pressure Pt is applied through the duct 512 to the train precessing force motor 370 to produce a torque which is applied through the bevelled gears 372 and the link 375 of Fig. 6 to the elevation gimbal 304 of the gyro 300 to apply a torque suited to cause the gyro to precess in train. The precessing forces thus set up precessing rates which will continue as long as the precessing forces remain constant. The rates are varied, however, in response to variations in the precessing forces produced by actuation of the handles 55 as they are adjusted to cause the spot of light reflected in the mirror 350 to remain on the target.

The control pressures also control the rate input mechanism of the automatic computing mechanism through the rate amplifier valves 520 and 521 of Fig. 14. Any change in pressure in the duct 508, for example, causes a change in the pressure in the chamber 537 of valve 521 which causes the displacement of the slide valve 531. This, through the hydraulic follow-up action, causes a corresponding displacement of the sleeve 530 and of the link 266 which is connected thereto. This movement of the link 266 actuates the elevation rate differential arm 264 of the automatic computing mechanism shown in Fig. 5.

In a similar manner, variations in the train control pressure Pt cause a movement of the slide valve 531t of the amplifier valve 520 which produces a corresponding movement of the sleeve 530t and of the link 155 which is attached thereto. This link 155 as shown in Fig. 5, applies the rate of train to the train rate differential mechanism 142.

The bearing Bg of the gun is automatically set into the computing mechanism by means of the flexible shaft 97 and bevelled gears 96 from the stationary rack 67 (Fig. 1). The elevation Eg of the gun is likewise automatically set into the computing mechanism by means of the elevation tape 169 and the elevation pulley 221.

The elevation tape 169, as shown in Fig. 4, is actuated by the pulley 222 attached to the link 47 constituting a part of the linkage which causes elevational movement of the box 40. Hence the movement of the pulley 222 is a measure of the movement of the control box 40 in elevation.

The range is set into the computing mechanism of Fig. 5 by means of the range tape 165 actuating the range pulley 166. The range tape 165 passes around the pulley 199 which is actuated with the pulley 200 by the belt 201 as shown in Fig. 4. The belt 201 is actuated by the pulley 202 controlled by the range link 204, which is actuated by the foot pedals 208 and 209 of Fig. 2. The differential 167 of Fig. 5 compensates for the movement of the pulley 166 caused by elevational movement of the box 40. If the range is otherwise fed to the computing mechanism, this differential may be omitted.

The air speed of the gunner's own ship is set into the computing mechanism by means of the knob 121 which actuates the air speed shaft 118, and the target size is set into the computing mechanism by means of the knob 344 shown in Fig. 6 which adjusts the range divider mechanism 323.

With these settings, the automatic computing mechanism operates in the manner previously described to compute the angles of deflection between the line of sight and the gun both in train and in elevation and through the output shafts 193 and 284 of Fig. 5 automatically set these deflection angles into the follow-up valves 601 and 600 to cause an angular adjustment of the sleeves 607 and 607e respectively.

Precessional movement of the gyroscope in train and in elevation causes corresponding movement of the valve shafts 605 and 605e of Fig. 14 which, through the hydraulic follow-up action, causes the sleeves 607 and 607e to move axially to effect a change in the response volumes of the chambers 612 and 612e. This change is supplied through ducts 641 and 641e to the hydraulic transmission mechanism shown in Fig. 15 to cause a corresponding movement of the pump control power units 671 and 673 which, in turn, actuates the control arms 660 and 663 of the variable displacement hydraulic pumps 661 and 662, the output of which controls the train motor 65 (Fig. 1) and the elevation motor 30 (Fig. 1). The train motor 65 drives the turret in train and the elevation motor 30 drives the gun mounts 12 and 13 in elevation in a direction and by an amount which is determined by the operation of the hydraulic pumps 661 and 662 respectively. The pumps are controlled by the spiral follow-up valves 600 and 601 of Fig. 14 in accordance with the setting of the shafts 605 and 605e and of the sleeves 607 and 607e. Hence the gun will take the required displacement from the line of sight and will remain in the proper position for firing as long as the sight follows the target with an even steady motion.

It is to be understood that suitable lockout mechanism may be provided to disconnect the automatic control from the gyroscope to permit the guns to be rapidly swung through a large arc so as to locate the target, after which the automatic computing and follow-up mechanism above described may again be thrown into operation. For example, when the automatic control is thus disconnected, the handles 55 may be connected to control the pumps 661 and 662 by suitable connection from the handles 55 direct to the pilot valves 670 and 672.

This system, because of its compactness, is suited for use in bomber turrets. It is to be understood, however, that with suitable modifications it may be applied to other uses such as battleship turrets, anti-aircraft gun control or the like.

It is to be noted that in the above system the spiral follow-up valves are so arranged that no appreciable drag is placed upon the gyroscope at any time. This is an important feature inasmuch as any reaction of the control forces on the gyroscope would interfere with the proper precessional movement thereof. The rate amplifier valves also permit any desired amplification of hydraulic power which may be required for operating the computing mechanisms.

It is also to be understood that the operator and sighting apparatus may be located at a distance from the turret or from the gun inasmuch as the entire control apparatus may be connected to the gun by suitable transmission or linkages. Thus the sighting apparatus may act as a director and a plurality of turrets or guns may be connected for operation in unison by the one sighting device and operator.

In the case of a battleship turret or for anti-aircraft it may be desirable to use other types of range-finding mechanisms, in which event the range as thus computed may be set into the range shaft 160 by any suitable means.

Although a specific embodiment of the invention has been shown for purposes of illustration, it is to be understood that the invention is capable of various adaptations as will be readily apparent to a person skilled in the art. The invention is only to be limited in accordance with the scope of the following claims.

What is claimed is:

1. Gyroscopically controlled mechanism comprising a housing containing a gyroscope and a gimbal mounting therefor, means to apply controlled torques about the two mounting axes of the gyroscope to cause its spin axis to precess about the mounting axes, power follow-up means controlled by movement of the gyroscope about its mounting axes relative to the housing to drive the housing in a direction to follow the said movement of the gyroscope, and means responsive to said torque applying means to modify the action of said power follow-up means to cause the housing to lead the gyroscope by an amount proportional to said torques.

2. A gun control mechanism comprising a gun mount mounted for movement in train and in elevation, a gyroscope mounted for movement in train and in elevation, sighting means movable with said gyroscope to maintain the line of sight parallel to the spin axis of said gyroscope, and hydraulic follow-up mechanism including control valves actuated by said gyroscope, reversible hydraulic motors driving said mount in train and in elevation and variable displacement reversible hydraulic pumps actuated by said gyro-controlled valves to control said last motors so as to cause the mount to follow the movement of said sight, automatic computing mechanism to compute the deflection in train and in elevation of said gun from said sight, and means setting the computed deflection into said control valves to modify the operation of said follow-up mechanism so as to cause the gun to be displaced from the sight by the computed amounts.

3. A gun control mechanism comprising a gun mount mounted for movement in train and in elevation, a gyroscope mounted for movement in train and in elevation, sighting means movable with said gyroscope to maintain the line of sight parallel to the spin axis of said gyroscope, pressure actuated hydraulic torque motors connected to apply precessing forces in train and in elevation respectively to said gyroscope, manual means generating control pressures to actuate said motors in accordance with the desired rates of train and elevation, hydraulic follow-up mechanism including control valves actuated by said gyroscope, reversible hydraulic motors driving said mount in train and in elevation and variable displacement reversible hydraulic pumps actuated by said gyro-controlled valves to control said last motors so as to cause the mount to follow the movement of said sight, automatic computing mechanism to compute the deflection in train and in elevation of said gun from said sight including rate input plungers, hydraulic valves actuating said plungers in accordance with said control pressures, to cause movement of said plungers corresponding to the rates of train and elevation respectively applied to said gyroscope by said hydraulic torque motors, and means setting the computed deflection into said control valves to modify the operation of said follow-up mechanism so as to cause the gun to be displaced from the sight by the computed amounts.

4. A gun control system as set forth in claim 3 in which said control valves include respectively sleeves connected to be adjusted in accordance with the computed deflections and shafts rotatable with the movement of said gyroscope in train and in elevation, said valves being mounted to restore the relative positions of said shafts and sleeves as the mount reaches its correct follow-up position.

5. A gun control mechanism comprising a turret mounted for rotational movement in train, a gun mount mounted on said turret for movement in elevation, a gyro-controlled mechanism including a sight mounted on said turret for movement in elevation with said mount, a pair of hydraulic control pressure generators on said turret, manual control means to control the pressures delivered by said generators, hydraulic precession torque motors connected to produce precessional movement of said gyro-controlled mechanism in train and in elevation, means supplying said control pressures to said motors, automatic computing mechanism to compute the deflection of the gun from said sight, including a pair of rate input members, means supplying said control pressures to actuate said rate input members, a pair of hydraulic follow-up systems including reversible, variable speed transmissions driving said turret in train and said mount in elevation and control valves actuated by precessional movement of said gyro-controlled mechanism and connected to control said transmissions to cause said gun to follow the movement of said sight, and means setting the outputs of said computing mechanism into said control valves to cause the gun to be displaced from the sight by the computed amount.

6. A gun control mechanism as set forth in claim 5 in which the rate input is controlled by a valve having a motion proportional to changes in pressure and actuated by said control pressure.

7. In a director system, a hydraulic follow-up valve comprising a casing, a cylindrical pilot valve mounted for rotation therein and having a spiral groove upon its surface, a sleeve valve relatively rotatable and axially movable on the pilot valve and having an internal circumferential curve communicating with said spiral groove and with the space in the casing at one end of the sleeve valve and having two radial passages terminating in internal ports spaced substantially the width of the spiral groove, said ports being positioned to be selectively connected with the spiral groove upon relative motion between the valves to build up a pressure in said space to cause axial displacement of said sleeve, a chamber at the other end of said sleeve having a response volume determined by the axial position of said sleeve, a follow-up member driven in response to variations in said response volume and adjusting means connected to cause rotational movement of said sleeve about said pilot valve for modifying the axial position of said sleeve and thereby modifying said response volume.

WILLIAM H. NEWELL.
JAMES D. TEAR.
LAWRENCE S. BROWN.

REFERENCES CITED

The following references are of record in the file of this patent:

UNITED STATES PATENTS

| Number | Name | Date |
| --- | --- | --- |
| 1,096,253 | Lang | May 12, 1914 |
| 1,231,257 | Herr | June 26, 1917 |
| 1,387,678 | Anderson | Aug. 16, 1921 |
| 1,390,471 | Sundhaussen | Sept. 13, 1921 |
| 1,604,545 | Bragg | Oct. 26, 1926 |
| 1,764,366 | Steubing | June 17, 1930 |
| 1,889,151 | Pechan et al. | Nov. 29, 1932 |
| 1,913,793 | Clementi et al. | June 13, 1933 |
| 1,940,681 | Henderson | Dec. 26, 1933 |
| 1,976,726 | House | Oct. 16, 1934 |
| 1,999,368 | Meyers et al. | Apr. 30, 1935 |
| 1,999,897 | Fieux | Apr. 30, 1935 |
| 2,195,351 | Ziebolz | Mar. 26, 1940 |
| 2,235,826 | Chafee | Mar. 25, 1941 |
| 2,273,171 | Bennett | Feb. 17, 1942 |
| 2,316,320 | Dewandre | Apr. 13, 1943 |
| 2,344,126 | Carlson | Mar. 14, 1944 |
| 2,352,344 | Rockwell | June 27, 1944 |
| 2,363,523 | Greenblatt et al. | Nov. 28, 1944 |
| 2,383,409 | Newell | Aug. 21, 1945 |
| 2,396,448 | Stevens | Mar. 12, 1946 |
| 2,399,726 | Doyle et al. | May 7, 1946 |
| 2,405,047 | Newell | July 30, 1946 |
| 2,407,191 | Tear et al. | Sept. 3, 1946 |
| 2,414,108 | Knowles et al. | Jan. 14, 1947 |
| 2,437,463 | Ford | Mar. 9, 1948 |

FOREIGN PATENTS

| Number | Country | Date |
| --- | --- | --- |
| 365,190 | Great Britain | Jan. 14, 1927 |
| 616,248 | Germany | Aug. 1, 1935 |
| 464,891 | Great Britain | Apr. 27, 1937 |